[19] United States Patent
Hayashi et al.

[11] Patent Number: 5,948,154
[45] Date of Patent: Sep. 7, 1999

[54] COLOR INK SET FOR INK-JET RECORDING

[75] Inventors: Hiroko Hayashi; Etsuko Yoshiike; Miharu Kanaya; Yoshiyuki Koike; Yasuhiro Ouki; Akio Owatari, all of Suwa, Japan

[73] Assignee: Seiko Epson Corporation, Tokyo-To, Japan

[21] Appl. No.: 08/860,535

[22] PCT Filed: Nov. 5, 1996

[86] PCT No.: PCT/JP96/03228

§ 371 Date: Aug. 20, 1997

§ 102(e) Date: Aug. 20, 1997

[87] PCT Pub. No.: WO97/16496

PCT Pub. Date: May 9, 1997

[30] Foreign Application Priority Data

| | | | |
|---|---|---|---|
| Nov. 2, 1995 | [JP] | Japan | 7-286290 |
| Nov. 2, 1995 | [JP] | Japan | 7-286291 |
| Nov. 2, 1995 | [JP] | Japan | 7-286292 |
| Nov. 2, 1995 | [JP] | Japan | 7-286293 |
| Nov. 20, 1995 | [JP] | Japan | 7-301729 |
| Dec. 26, 1995 | [JP] | Japan | 7-339754 |
| Jan. 19, 1996 | [JP] | Japan | 8-007219 |

[51] Int. Cl.$^6$ ................................................. C09D 11/02
[52] U.S. Cl. ........................ 106/31.48; 106/31.52; 106/31.47; 106/31.58
[58] Field of Search ...................... 106/34.48, 31.52, 106/31.47, 31.58

[56] References Cited

U.S. PATENT DOCUMENTS

| | | | |
|---|---|---|---|
| 4,661,158 | 4/1987 | Kobayashi et al. | 106/31.48 |
| 4,771,129 | 9/1988 | Kawashit et al. | 106/31.48 |
| 5,383,960 | 1/1995 | Gregory et al. | 106/31.52 |
| 5,395,434 | 3/1995 | Tochihara et al. | 106/31.43 |
| 5,534,051 | 7/1996 | Lauw | 106/31.49 |
| 5,536,306 | 7/1996 | Johnson et al. | 106/31.49 |
| 5,599,386 | 2/1997 | Sano et al. | 106/31.48 |
| 5,622,550 | 4/1997 | Konishi et al. | 106/31.48 |
| 5,704,969 | 1/1998 | Kanaya et al. | 106/31.48 |
| 5,713,992 | 2/1998 | Satoh et al. | 106/31.48 |
| 5,749,951 | 5/1998 | Yoshiike et al. | 106/31.48 |
| 5,753,016 | 5/1998 | Hayashi et al. | 106/31.48 |

*Primary Examiner*—Helene Klemanski
*Attorney, Agent, or Firm*—Ladas & Parry

[57] ABSTRACT

A yellow ink composition and a magenta ink composition are provided which have good properties satisfying requirements for a color ink jet recording ink, particularly a requirement that the color ink composition is less likely to cause clogging of nozzles, and can realize a printed image having excellent tone, waterfastness, storage stability, and lightfastness. Further, a color ink set comprising the above ink compositions in combination with a particular cyan ink composition and a particular black ink composition are also provided. A yellow ink composition comprising a dye represented by the following formula (XI) in combination with a dye represented by the following formula (XII) is a fundamental color ink composition:

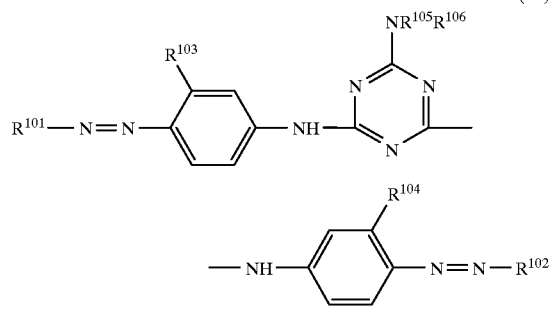

(XI)

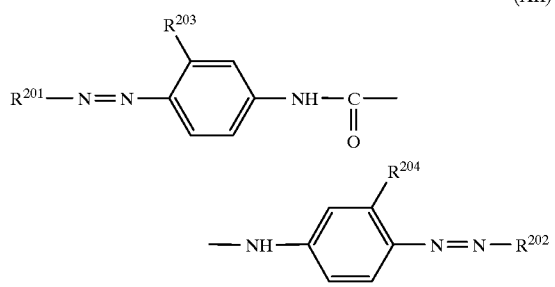

(XII)

wherein $R^{101}$ and $R^{102}$ represent phenyl or naphthyl substituted by a hydroxyl group, —$SO_3M$, or —COOM.

26 Claims, No Drawings

COLOR INK SET FOR INK-JET RECORDING

BACKGROUND OF THE INVENTION

1. Field of the Invention

The present invention relates to a color ink composition, particularly an ink composition suitable for use in ink jet recording, and an ink jet recording method using the same.

2. Background Art

In the formation of a color image using an ink composition, particularly in the formation of a color image by using an ink jet recording method, it is common practice to use at least a magenta ink, a yellow ink, and a cyan ink. Properties required of such inks include: stability of the ink under storage conditions such that the composition and properties of the ink do not undergo any change in composition and properties; stability of the ink such that the nozzles of the print head do not become clogged; and suitable property values of the ink, such as viscosity and surface tension; capability of the ink to provide an image possessing a high optical density; capability of the ink to provide sharp tone and image; excellent fastness, for example, excellent waterfastness and lightfastness; freedom from odor; and good safety.

Many of these property requirements have been satisfied by an aqueous ink comprising a water-soluble dye dissolved in water or a mixed system of water and a water-soluble solvent.

Properties, such as tone, waterfastness, and lightfastness, are greatly depend on dyes used, leading to various studies on the dyes.

For example, C.I. Acid Yellow 17 and 23 are known as a yellow dye having a high water solubility. The high water solubility of these dyes are less likely to cause clogging of nozzles. However, the problems of waterfastness and lightfastness have remained unsolved.

Japanese Patent Laid-Open No. 96967/1984 discloses the use of C.I. Direct Yellow 86, 100, and 142 having good lightfastness. So far as the present inventors know, however, these dyes have a fear of nozzles being clogged. Further, with these dyes, it is difficult to provide a sharp tone. Japanese Patent-Laid Nos. 306075/1988 and 28690/1988 disclose the formation of a color image using a yellow dye represented by the formula (VII) which is one of the dyes used in the present invention, and the claimed advantage of this method is that a good color image can be provided. According to an experiment conducted by the present inventors, however, there is still room for an improvement in the prevention of clogging and the realization of a sharp tone. Further, there is room for an improvement in the storage stability of prints prepared with the dye. In particular, on a specialty paper, having a coating, for ink jet recording, the dye bleeds due to moisture in the environment, causing the image to be blurred.

Regarding a magenta composition, it has been pointed out that a deterioration in prints is mostly attributable to magenta. As compared with a yellow ink composition, a cyan ink composition, and a black ink composition, the magenta ink composition exhibits more significant fading, leading to a change in tone of the printed image. Further, when the print is allowed to stand under an environment having high humidity, the feathering of magenta occurs, resulting in deteriorated quality of the printed image.

Further, in color printing using a plurality of ink compositions, similar properties are required of all the ink compositions used. When one ink composition is poor in a certain property, the dignity of the whole image is lost.

One of the color image forming methods is to conduct overprinting using three colors of yellow, magenta, and cyan ink compositions to realize red, green, and blue. Black may be prepared with overprinting all the yellow, magenta, and cyan ink compositions or with printing a black ink individually provided. In the color image forming methods, the ink compositions, as such, each should have a good tone and, at the same time, when overprinted, should exhibit a good tone.

Further, an ink composition has bee desired which can realize a good printed image, especially a printed image having excellent waterfastness and a good tone, on recording media, i.e., on specialty paper having a coating, as well as on pain paper.

SUMMARY OF THE INVENTION

Accordingly, an object of the present invention is to provide an ink set which can realize a good color printed image, especially an image having good color reproduction without bleeding.

Another object of the present invention is provide yellow and magenta ink composition, which are also used in the above ink set, having good properties. In particular, the present invention aims to provide ink compositions satisfying property requirements for a color ink jet recording ink, especially yellow and magenta ink compositions which are less likely to cause clogging of nozzles and, at the same time, can realize a printed image having excellent tone, waterfastness, storage stability, and lightfastness.

According to one aspect of the present invention, there is provided an ink set comprising yellow, magenta and cyan ink compositions, the yellow ink composition comprising a dye represented by the formula (XI) and a dye represented by the formula (XII):

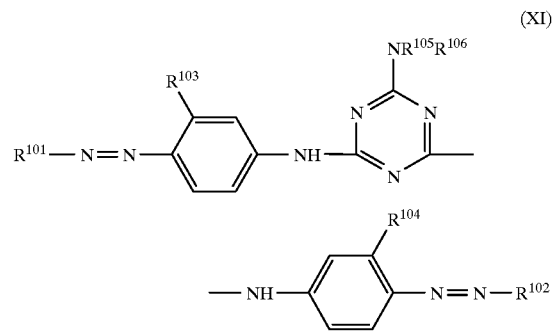

wherein $R^{101}$ and $R^{102}$ each independently represent phenyl or naphthyl substituted by a substituent selected from the group consisting of a hydroxyl group, $-SO_3M$, and $-COOM$, $R^{103}$ and $R^{104}$ each independently represent a hydrogen atom, an alkyl, or methoxy, $R^{105}$ and $R^{106}$ each independently represent a hydrogen atom, a hydroxyl group, or $C_2H_4OH$, and M represents an alkali metal, ammonium, or an organic amine; and

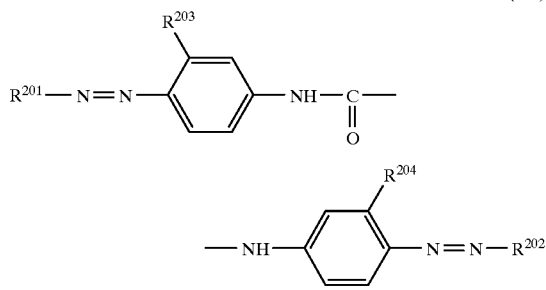

(XII)

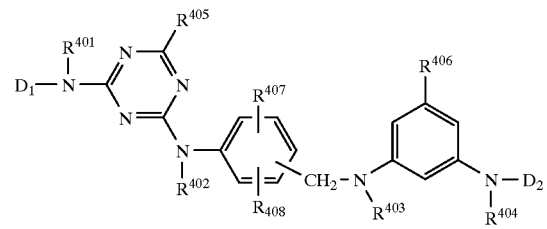

(XIV)

wherein $R^{201}$ and $R^{202}$ each independently represent phenyl or naphthyl substituted by a substituent selected from the group consisting of a hydroxyl group, —$SO_3M$, and —COOM,
$R^{201}$ and $R^{202}$ represent a hydrogen atom, an alkyl, or methoxy, and
M represents an alkali metal, ammonium, or an organic amine, and
the magenta ink composition comprising at least one selected from the group consisiting of a dye represented by the formula (XIII), a dye represented by the formula (XIV), C.I. Reactive Red 147 and C.I. Reactive Red 180:

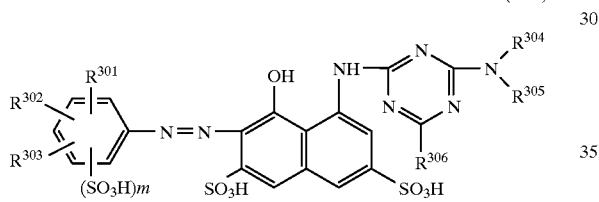

(XIII)

wherein $R^{301}$ $R^{302}$, and $R^{303}$ each independently represent a substituted or unsubstituted $C_{1-9}$ alkyl or $C_{1-9}$ alkoxy, a halogen atom, a hydrogen atom, hydroxyl, a substituted or unsubstituted carbamoyl, a substituted or unsubstituted sulfamoyl, a substituted or unsubstituted amino, nitro, a group —$SO_2R^{307}$ (wherein $R^{307}$ represents an ester forming group, a substituted or unsubstituted $C_{1-9}$ alkyl, or a substituted or unsubstituted $C_{6-15}$ aryl), a group —COOM (wherein M represents a hydrogen atom, an alkali metal, ammonia, or a cationic species derived from an amine), or a group —$COR^{308}$ (wherein $R^{308}$ represents an ester forming group),
m is 0, 1, or 2,
$R^{304}$ and R305 each independently represent a hydrogen atom, a substituted or unsubstituted $C_{1-18}$ alkyl, a substituted or unsubstituted $C_{2-18}$ alkenyl, a substituted or unsubstituted aryl, a substituted or unsubstituted aralkyl, a substituted or unsubstituted alicyclic group, or a substituted or unsubstituted heterocyclic group, and
$R^{306}$ represents a group —$NR^{309}R^{310}$ (wherein $R^{309}$ and $R^{310}$ each independently represent a hydrogen atom, a substituted or unsubstituted $C_{1-18}$ alkyl, or a substituted or unsubstituted aryl) or a group —$OR^{311}$ (wherein $R^{311}$ has the same meaning as $R^{304}$); and wherein $D_1$ and $D_2$ each independently represent an azo chromophore,
$R^{401}$, $R^{402}$, $R^{403}$, and $R^{404}$ each independently represent a hydrogen atom or a substituted or unsubstituted alkyl,
$R^{405}$ and $R^{406}$ each independently represent a hydroxyl group or an amino group,
$R^{407}$ and $R^{408}$ each independently represent a hydrogen atom, a halogen atom, or an alkyl, alkoxy, nitro, carboxyl, or sulfone group, and
M represents an alkali metal, ammonium, or an organic amine.

According to a preferred embodiment of the present invention, the cyan ink composition in the ink set comprises a phthalocyanine dye or C.I. Direct Blue 199 as a colorant.

Further, according to a preferred embodiment of the present invention, the cyan ink composition comprises a dye represented by the formula (XV) as a colorant:

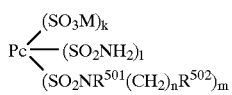

(XV)

wherein Pc represents a phthalocyanine group coordinated with Cu, Fe, Co, or Ni as a central atom,
$R^{501}$ represents a hydrogen atom or a substituted or unsubstituted alkyl,
$R^{502}$ represents a hydroxyl group, COOH, a substituted phenyl or $NR^{503}R^{504}$ wherein $R^{503}$ represents a hydrogen atoms or a substituted alkyl and $R^{504}$ represents a substituted alkyl or a substituted phenyl,
M represents an alkali metal, ammonium, or an organic amine,
k and l are each independently 0 to 1,
m is 1 to 4,
provided that $2 \leq k+l+m \leq 4$,
n is an integer of 1 to 15, provided that, when $R^{502}$ represents a hydroxyl group, n is an integer of 5 to 15.

Furthermore, according to a preferred embodiment of the present invention, the ink set of the present invention comprises any one of the following three black ink compositions.

The first embodiment of the black ink composition is an ink composition comprising at least a first group of dyes and a second group of dyes,
the first group comprising a dye represented by the following formula (I) wherein $R^1$ is $PO(OM)_2$ in the m-position to the azo group and a dye represented by the following formula (I) wherein $R^1$ is COOM in the m-position to the azo group, (I)
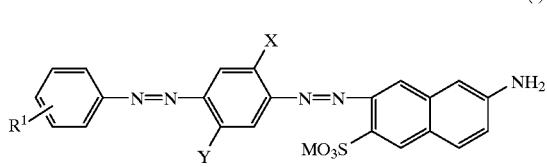

(VI)
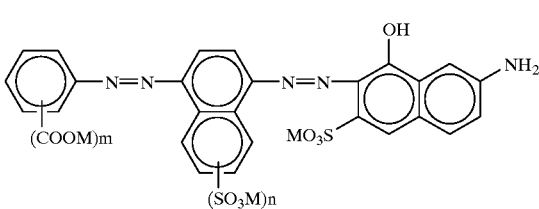

wherein $R^1$ represents —$PO(OM)_2$ or —COOM, X and Y each independently represent a $C_{1-4}$ alkoxy and M represents a cation of a group selected from the group consisting of a hydrogen atom, an alkali metal, ammonia, and an organic amine; and the second group of dyes comprising a dye represented by the following formula (II) and/or a dye represented by the following formula (III):

(II)
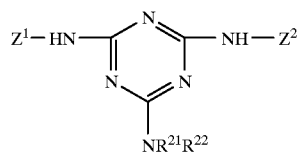

(III)
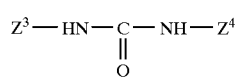

wherein $R^{21}$ and $R^{22}$ each independently represent a hydrogen atom or —$C_2H_4OH$, $Z^1$, $Z^2$, $Z^3$ and $Z^4$ each independently represent a group represented by the following formula (IV) or (V):

(IV)
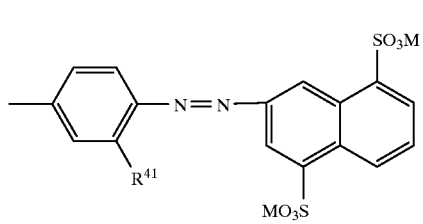

(V)
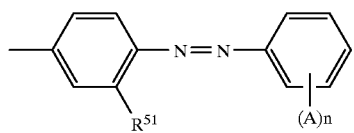

wherein $R^{41}$ and $R^{51}$ each independently represent a hydrogen atom, a $C_{14}$ alkyl or a $C_{14}$ alkoxy, A represents —$SO_3M$ or —COOM, M is as defined above and n is 1 or 2.

The second embodiment of the black ink composition is an ink composition comprising a dye represented by the formula (I) defined above wherein $R^1$ is in the m-position to the azo group and represents $PO(OM)_2$ or COOM, and a dye represented by the following formula (VI):

wherein M is as defined above;
m is 1 or 2; and
n is 0 or 1.

The third embodiment of the black ink composition is an ink composition comprising at least a group A of dyes and a group B of dyes, the group A of dyes comprising a dye represented by the formula (I) defined above and a dye represented by the formula (VI) defined above, the group B of dyes being the second group of dyes defined above in connection with the first embodiment of the black ink composition.

DETAILED DESCRIPTION OF THE INVENTION

The ink composition according to the present invention is used in recording methods using an ink composition. Recording methods using an ink composition include, for example, ink jet recording, recording using a writing material, such as a pen, and other various printing methods, such as a recorder and a pen plotter. In particular, the ink composition according to the present invention is suitable for use in the ink jet recording system. Ink jet recording methods usable herein include ejection of liquid droplets by taking advantage of oscillation of piezoelectric device, a method utilizing heat energy, and other various ink jet recording methods which are currently known or will be known. After printing, the ink composition according to the present invention may be dried and fixed by suitable heat fixation means (for example, hot air, heating roll or plate, infrared rays).

The term "color printing," particularly "color ink jet recording method," refers to a printing method which forms a color image using a plurality of ink compositions, more specifically refers to a recording method wherein an ink set comprising a combination of a magenta ink composition, a yellow ink composition, and a cyan ink composition is used to print three colors of magenta, yellow, and cyan, followed by overprinting of any two of these three colors to form red, green, and blue. In the method, black is formed by overprinting the three colors or by using a black ink.

Yellow Ink Composition

The yellow ink composition according to the present invention comprises, as a dye, a dye represented by the formula (XI) and a dye represented by the formula (XII). The use of a combination of the two dyes realizes a sharp yellow color and an image having excellent light fastness and waterfastness. The ink composition using the dyes in combination can effectively prevent clogging of nozzles, in ink jet recording. Further, an image printed by the ink composition using the above dyes in combination is stable during storage and does not cause such an unfavorable phenomenon that, due to the moisture in the environment, the dye bleeds in the printed image, causing the image to be blurred.

The amount of each of the dyes added may be suitably determined in such an amount range as will provide the effect of the present invention. For example, it is preferably about 0.3 to 2.0% by weight, more preferably about 0.5 to 1.5% by weight. The dye represented by the formula (XI) may be used as a mixture of two or more dyes represented by the formula (XI), and the same is true of the dye represented by the formula (XII).

In the formula (XI), at least one hydrogen atom on phenyl or naphthyl represented by $R^{101}$ and $R^{102}$ may be optionally substituted. Examples of the substituent include a hydroxyl group, $SO_3M$, and $COOM$ wherein M is as defined below.

The alkyl and alkoxy represented by $R^{103}$ and $R^{104}$ are, for example, $C_{1-4}$, preferably $C_{1-2}$ alkyl and alkoxy.

In the formula (XI), alkali metals represented by M include, for example, lithium, sodium, and potassium. Organic amines represented by M include, for example, mono-, di-, or tri-lower alkyl-substituted (preferably, $C_{1-4}$ alkyl-substituted) amine, allylamine, morpholine, and piperidine. More specific examples thereof include methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, and dibutylamine.

In the formula (XII), at least one hydrogen atom on phenyl or naphthyl represented by $R^{201}$ or $R^{202}$ may be optionally substituted, and examples of the substituent include those as described above in connection with phenyl or naphthyl represented by $R^{101}$ and $R^{102}$.

The alkyl and alkoxy represented by $R^{201}$ and $R^{202}$ are, for example, $C_{1-4}$, preferably $C_{1-3}$ alkyl and alkoxy.

In the formula (XII), M may be as defined above.

Preferred examples of dyes represented by the formula (I) are as follows.

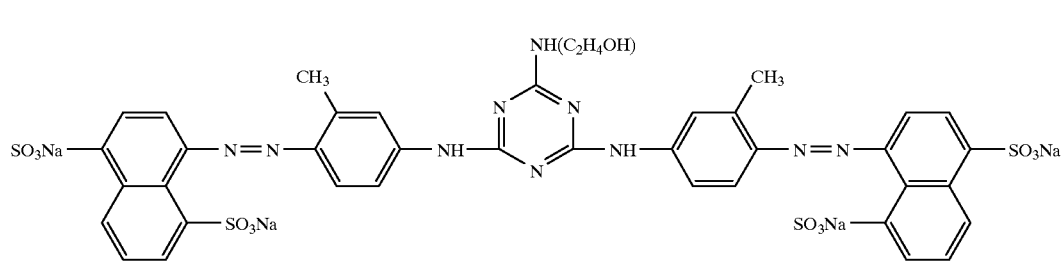

(Y-1)

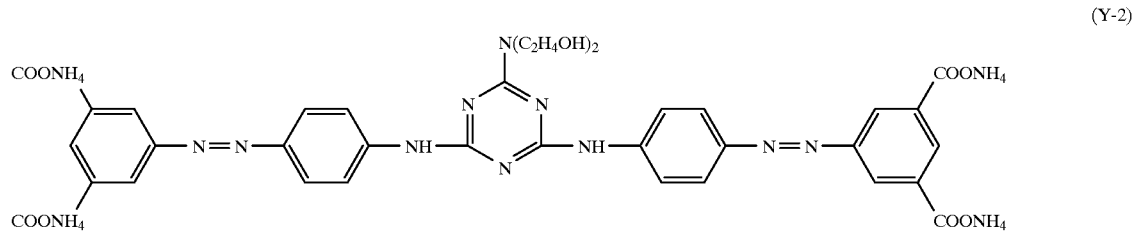

(Y-2)

Preferred examples of dyes represented by the formula (XII) are as follows.

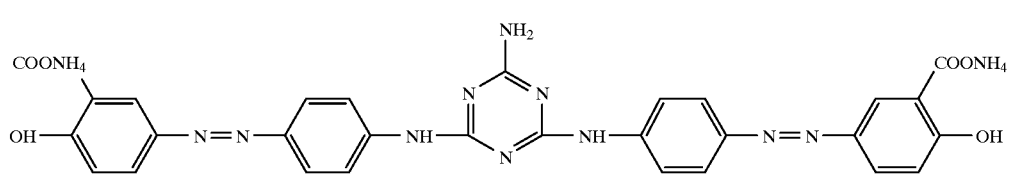

(Y-3)

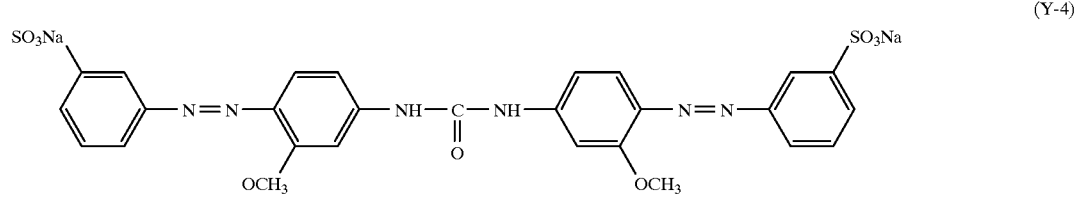

(Y-4)

-continued

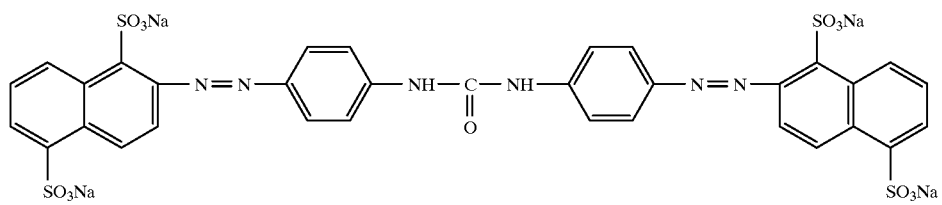

(Y-5)

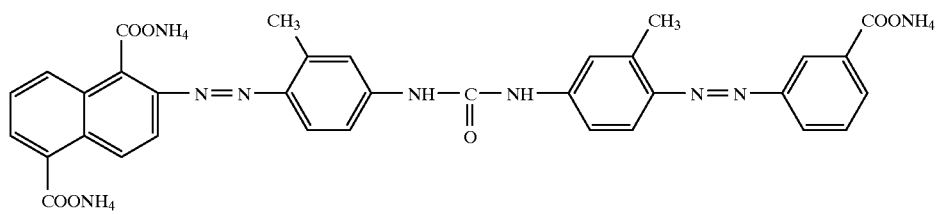

(Y-6)

The ink composition according to the present invention basically comprises the above dyes, water, and a water-soluble organic solvent.

The water-soluble organic solvent is preferably a water-soluble, high-boiling, low-volatile organic solvent. Specific examples of preferred water-soluble, high-boiling, low-volatile, organic solvents include: alkylene glycols with the alkylene group having 2 to 6 carbon atoms, such as ethylene glycol, diethylene glycol, triethylene glycol, and propylene glycol; glycerin; polyalkylene glycols such as polyethylene glycol and polypropylene glycol; polyhydric alcohol lower monoalkyl ethers such as ethylene glycol monomethyl (or ethyl) ether, diethylene glycol monomethyl (or ethyl) ether, and triethylene glycol monomethyl (or ethyl) ether; and polyhydric alcohol lower dialkyl ethers such as triethylene glycol dimethyl (or ethyl) ether. The amount of these water-soluble, low-boiling, low-volatile solvent added may be suitably determined. For example, it is preferably in the range of from 15 to 35% by weight. This is because these solvents left on a printed image often absorb moisture, causative of bleed during storage.

Other organic solvents which may be added to the yellow ink composition according to the present invention include: amides such as dimethylformamide and dimethylacetamide; ketones or ketone alcohols such as acetone and diacetone alcohol; ethers such as tetrahydrofuran and dioxane; alkyl alcohols having 1 to 5 carbon atoms, such as methyl alcohol, ethyl alcohol, n-propyl alcohol, and n-butyl alcohol; and sulfolane, pyrrolidone, N-methyl-2-imidazolidinone, and 1,5-pentanediol. These organic solvents may be used alone or as a mixture of two or more. Further, they may be used in combination with the water-soluble, high-boiling, low-volatile solvent.

The yellow ink composition according to the present invention may further comprise a polyhydric alcohol lower alkyl ether. Preferred examples of polyhydric alcohol lower alkyl ethers usable herein include mono-, di-, and tri-ethylene glycol $C_{1-6}$ alkyl ether and mono-, di-, and tri-propylene glycol $C_{1-6}$ alkyl ether, and more preferred examples thereof include triethylene glycol monobutyl ether, diethylene glycol monobutyl ether, diethylene glycol monoethyl ether, diethylene glycol monomethyl ether, and propylene glycol monobutyl ether. Among them, diethylene glycol monobutyl ether is most preferred. The amount of the polyhydric alcohol lower alkyl ether may be suitably determined. For example, it is preferably about 5 to 15% by weight.

The ink composition according to the present invention may further comprise an acetylene glycol represented by the following formula:

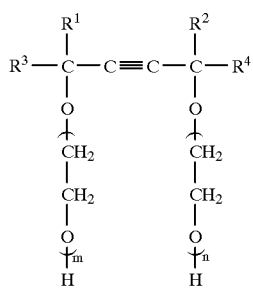

wherein $R^1$, $R^2$, $R^3$ and $R^4$ each independently represent a $C_{1-6}$ alkyl and n+m is 0 to 30.

Specific examples of more preferred acetylene glycol represented by the above formula include those listed in the following formula.

| No. | $R^1$ | $R^2$ | $R^3$ | $R^4$ | n + m |
|---|---|---|---|---|---|
| 1 | iso-Butyl | Methyl | Methyl | iso-Butyl | 10 |
| 2 | iso-Butyl | Methyl | Methyl | iso-Butyl | 3.5 |
| 3 | Ethyl | Methyl | Methyl | Ethyl | 10 |
| 4 | Methyl | Methyl | Methyl | Methyl | 0 |
| 5 | Ethyl | Methyl | Methyl | Ethyl | 0 |
| 6 | iso-Butyl | Methyl | Methyl | iso-Butyl | 0 |

Among them, acetylene glycols of Nos. 1 and 6 are particularly preferred.

Commercially available acetylene glycols may also be utilized, and examples thereof include Surfynol 82, 104, 440, 465, and TG (Olfine STG) (manufacturer: Air Products and Chemicals, Inc., selling agency: Nissin Chemical Industry Co., Ltd.).

The amount of the acetylene glycol may be suitably determined. For example, it is preferably about 0.3 to 1.8% by weight.

According to a preferred embodiment of the present invention, the acetylene glycol is used in combination with the polyhydric alcohol lower alkyl ether. This combined use enables the ink composition deposited onto a recording medium to quickly permeate into the recording medium, effectively preventing a deterioration in the print quality attributable to color-to-color mixing, between adjacent dots, which is a problem often found in color ink jet recording.

Further, according to a preferred embodiment, in the yellow ink composition according to the present invention, when the dyes represented by the formulae (XI) and (XII) have a group COOM, at least two components selected from the group consisting of (a) an amine having a boiling point of −40° C. to 90° C., (b) an amine having a boiling point of 90° C. or above, and (c) an inorganic base may be contained in the ink composition. The addition of these components can realize the prevention of nozzles from being clogged and the waterfastness of the printed image on a higher level. The total amount of these components added is preferably about 0.1 to 5% by weight, more preferably about 0.5 to 2% by weight. According to a preferred embodiment, the ink composition with these components added thereto is preferably adjusted to pH 8.5–11.

Specific examples of preferred amines (a) having a boiling point of −40° C. to 90° C. include ammonium, methylamine, dimethylamine, trimethylamine, ethylamine, diethylamine, triethylamine, propylamine, isopropylamine, diisopropylamine, butylamine, and isobutylamine. Specific examples of preferred amines (b) having a boiling point of 90° C. or above include monoethanolamine, diethanolamine, triethanolamine, 2-dimethylaminoethanol, morpholine, aminomethylpropanol, monoisopropylamine, dipropylamine, and butylamine. Examples of inorganic bases (c) usable herein include potassium hydroxide, sodium hydroxide, and lithium hydroxide.

Further, the yellow ink composition according to the present invention may further comprise additional additives for improving various properties. Examples of additives usable herein include those, added for modification of various property values, such as viscosity, surface tension, pH, and specific resistance, and preservative and antimold purposes, such as anionic surfactants such as salts of fatty acids, salts of alkylsulfate esters, alkylbenzenesulfonic acids, and alkylnaphthalenesulfonates; nonionic surfactants such as acetylene glycol, polyoxyethylene alkylphenyl ethers, polyoxyethylene alkylphenyl ether, polyoxyethylene fatty acid esters, and sorbitan fatty acid esters; naturally occurring or synthetic polymeric materials such as celluloses, polyvinyl pyrrolidone, polyvinyl alcohol, and water-soluble resins; amines such as diethanolamines and triethanolamines; inorganic salts such as lithium chloride, ammonium chloride, and sodium chloride; and benzotriazole.

The yellow ink composition according to the present invention may be prepared by a conventional method. For example, necessary ingredients are thoroughly mixed together and dissolved in one another, the solution is filtered through a membrane filter having a pore diameter of 0.8 μm and deaerated by means of a vacuum pump to prepare an ink.

Magenta Ink Composition

The magenta ink composition according to the present invention comprises at least one member selected from the group consisting of a dye represented by the general formula (XIII), a dye represented by the general formula (XIV), C.I. Reactive Red 147, and C.I. Reactive Red 180. The ink composition comprising these dyes can sharply reproduce magenta and, at the same time, can realize an image having excellent light fastness and waterfastness. The magenta ink composition according to the present invention can effectively prevent clogging of nozzles in ink jet recording. Further, an image printed by the magenta ink composition of the present invention is stable during storage and does not cause such an unfavorable phenomenon that the dye, due to moisture in the environment, bleeds in the printed image resulting in blurred image.

According to a preferred embodiment of the present invention, the dyes may be added in combination of two or more.

In the magenta ink composition according to the present invention, the amount of the dye added may be suitably determined in such an amount range as will provide the effect of the present invention. For example, it is preferably about 0.3 to 4.0% by weight, more preferably about 1.0 to 3.0% by weight.

In the formula (XIII), the $C_{1-9}$ alkyl represented by $R^{301}$, $R^{302}$, and $R^{303}$ is preferably a $C_{1-4}$ alkyl. At least one hydrogen atom on the alkyl may be optionally substituted, and examples of the substituent include halogen atoms and amino groups. At least one hydrogen atom on the amino group may be optionally substituted by a $C_{1-4}$ alkyl. Specific examples of the $C_{1-9}$ alkyl represented by $R^{301}$, $R^{302}$, and $R^{303}$ include methyl, ethyl, n-propyl, isopropyl, n-butyl, trifluoromethyl, and dimethylaminomethyl.

In the formula (XIII), the $C_{1-9}$ alkoxy represented by $R^{301}$, $R^{302}$, and $R^{303}$ is preferably a $C_{1-4}$ alkoxy. Specific examples of the alkoxy group include methoxy, isopropoxy, and n-butoxy.

In the formula (XIII), at least one hydrogen atom on the carbamoyl represented by $R^{301}$, $R^{302}$, and $R^{303}$ may be optionally substituted, and examples of the substituent include lower alkyls and aryls (preferably phenyl and naphthyl groups). Specific examples of the substituted carbamoyl group include N,N-dimethylcarbamoyl and phenylcarbamoyl.

In the formula (XIII), at least one hydrogen atom on the sulfamoyl represented by $R^{301}$, $R^{302}$, and $R^{303}$ may be optionally substituted, and examples of the substituent include lower alkyls and aryls (preferably phenyl and naphthyl groups). At least one hydrogen atom on the aryl may be optionally substituted, and examples of the substituent include carboxyl groups. Specific examples of the substituted sulfamoyl group include N-methylsufamoyl, N-ethylsufamoyl, N-ethyl-N-phenylsufamoyl, N,N-dimethylsulfamoyl, and p-carboxylphenylsufamoyl.

Substituents for the amino represented by $R^{301}$, $R^{302}$, and $R^{303}$ include lower alkyls, $C_{1-4}$ alkylcarbonyls, carbamoyl, and aryl (preferably phenyl and naphthyl). Specific examples of the substituted amino group include N-methylamino, carbamoylamino, N,N-dimethylamino, and acetylamino.

In the group $-SO_2R^{307}$ represented by $R^{301}$, $R^{302}$, and $R^{303}$, $R^{307}$ represents an ester forming group, a $C_{1-9}$ alkyl, or a $C_{6-15}$ aryl. The term "ester forming group" used herein refers to a group which, together with a sulfonic acid, forms an ester. Preferred examples thereof include lower alkoxyls and aryloxys (preferably phenyloxy and naphthyloxy). Specific examples of the group $-SO_2R^{307}$ wherein $R^{307}$ represents the ester forming group include methoxysulfonyl, propoxysulfonyl, and phenoxysulfonyl.

In the group $-SO_2R^{307}$, the $C_{1-9}$ alkyl represented by $R^{307}$ is preferably a $C_{1-4}$ alkyl, more preferably a $C_{1-2}$ alkyl. The $C_{6-15}$ aryl represented by $R^{307}$ is preferably phenyl, tolyl, xylyl, biphenyl, naphthyl, anthryl, or phenanthryl. At least one hydrogen atom on the $C_{1-9}$ alkyl or the $C_{6-15}$ aryl may be optionally substituted, and examples of the substituent include hydroxyl and phenyl groups. Specific examples of the group $-SO_2R^{307}$ wherein $R^{307}$ represents the $C_{1-9}$ alkyl or the $C_{6-15}$ aryl include hydroxyethylsulfonyl and benzylsulfonyl.

In the group —COOM, examples of the alkali metal as the source of the cationic species represented by M include lithium, potassium, and sodium. Preferred examples of the amine as the source of the cationic species represented by M include ammonia, methylamine, dimethylamine, trimethylamine, ethylamine, diethylamine, triethylamine, propylamine, isopropylamine, diisopropylamine, butylamine, isobutylamine, monoethanolamine, diethanolamine, triethanolamine, 2-dimethylaminoethanol, morpholine, aminomethyl propanol, monoisopropylamine, dipropylamine, and dibutylamine.

In the group -$COR^{308}$ represented by $R^{301}$, $R^{302}$, and $R^{303}$, $R^{308}$ represents an ester forming group. The term "ester forming group" used herein refers to a group which, together with a carboxylic acid, forms an ester. Preferred examples thereof include lower alkoxys. Specific examples of the group -$COR^{308}$ include methoxycarbonyl and propoxycarbonyl.

In the formula (XIII), the number of m, that is, the number of groups —$SO_3H$ on the phenyl ring in the formula (XIII), is 0, 1, or 2, and, preferably, m represents 1 with the group —$SO_3H$ being in the ortho position to the azo group.

In the formula (XIII), the $C_{1-18}$ alkyl represented by $R^{304}$, $R^{305}$, $R^{309}$, $R^{310}$, and $R^{311}$ is preferably a $C_{1-12}$ alkyl, more preferably a $C_{1-8}$ alkyl. Part or the whole of the alkyl group may be a cycloalkyl, for example, a $C_{5-12}$ cycloalkyl, preferably a $C_{5-6}$ cycloalkyl. At least one hydrogen atom on the alkyl group may be optionally substituted, and examples of the substituent include lower alkyls, carboxyl, mercapto, carbamoyl, and morpholino. Specific examples of substituted or unsubstituted $C_{1-18}$ alkyls include ethyl, n-butyl, n-octyl, ethylcyclohexyl, hydroxyethyl, carboxypropyl, carboxycyclohexylmethyl, 1-carboxy-2-mercaptoethyl, 1-carboxy-2-carbamoylethyl, 1-isopropyl-1-carboxymethyl, 1,2-dicarboxypropyl, and morpholinoethyl.

In the formula (XIII), the $C_{2-18}$ alkenyl represented by $R^{304}$, $R^{305}$, and $R^{311}$ is preferably a $C_{2-12}$ alkenyl, more preferably a $C_{2-8}$ alkenyl. At least one hydrogen atom on the alkenyl group may be optionally substituted, and examples of the substituent include $C_{1-8}$ alkoxys and hydroxy. Specific examples of substituted or unsubstituted $C_{2-18}$ alkenyls include 2-methyl-1-propenyl, vinyls, and allyls.

The aryl represented by $R^{304}$, $R^{305}$, and $R^{311}$ is preferably a $C_{6-15}$ aryl, and examples thereof include phenyl, tolyl, xylyl, biphenyl, naphthyl, anthryl, and phenanthryl. At least one hydrogen atom on the aryl group may be optionally substituted, and examples of the substituent include substituted or unsubstituted $C_{1-9}$ alkyls, $C_{1-9}$ alkoxys, halogen atoms, hydroxyl, substituted or unsubstituted carbamoyls, substituted or unsubstituted sulfamoyls, substituted or unsubstituted aminos, nitro, and a group —$SO_2R^{312}$ (wherein $R^{312}$ represents an ester forming group), carboxyl, or a group —$COR^{313}$ (wherein $R^{313}$ represents an ester forming group). Substituents for substituted $C_{1-9}$ alkyls, substituted carbamoyls, substituted sulfamoyls, and substituted aminos include those as described above in connection with the substituted $C_{1-9}$ alkyl, the substituted carbamoyls, the substituted sulfamoyls, and the substituted aminos represented by $R^{301}$, $R^{302}$, and $R^{303}$. However, it should be noted that the substituent for sulfamoyl is preferably a $C_{4-9}$ alkyl group rather than the lower alkyl group for sulfamoyl represented by $R^{301}$, $R^{302}$, and $R^{303}$. Examples of ester forming groups represented by $R^{312}$ and $R^{313}$ in —$SO_2R^{312}$ and —$COR^{313}$ include those described above in connection with the ester forming groups represented by $R^{307}$ and $R^{308}$ in —$SO_2R^{307}$ and —$COR^{308}$ which are represented by $R^{301}$, $R^{302}$, and $R^{303}$. Regarding the ester forming group represented by $R^{313}$, $C_{5-9}$ alkoxys are preferred rather than the lower alkoxys represented by $R^{307}$.

Specific examples of substituted or unsubstituted $C_{6-15}$ aryls include 3,4-dicarboxyphenyl, 4-butylphenyl, and 4-carboxyphenyl.

The aralkyl represented by $R^{304}$, $R^{305}$, and $R^{306}$ is preferably a $C_{7-15}$ aryl, and examples thereof include benzyl, phenylethyl, methylbenzyl, and naphthylmethyl. At least one hydrogen atom on the aryl may be optionally substituted, and examples of the substituent include carboxyl and hydroxyl groups. Specific examples of substituted or unsubstituted $C_{7-15}$ aryls include 1-carbonyl-2-phenylethyl, 1-carboxy-2-hydroxyphenylethyl, and 4-carboxybenzyl.

The alicyclic group represented by $R^{304}$, $R^{305}$, and $R^{306}$ is preferably a $C_{6-15}$ cycloalkyl. At least one hydrogen atom on the alicyclic group may be optionally substituted, and specific examples of the substituent include carboxyl. Specific examples of substituted or unsubstituted alicyclic groups include cyclohexyl and 4-carboxycyclohexyl.

The heterocyclic group represented by $R^{304}$, $R^{305}$, and $R^{306}$ is preferably a five- to twelve-membered heteroaromatic ring or heterosaturated ring containing at least one hetero atom selected from nitrogen, oxygen, and sulfur atoms. The heteroaromatic ring and the heterosaturated ring may optionally condense with other ring(s) (for example, a benzene ring) to form a condensed ring. Preferable examples of the heteroaromatic ring include five- or six-membered heteroaromatic rings containing one or two nitrogen atoms (for example, pyrrolyl, pyridyl, imidazolyl, pyrazolyl, pyrazinyl, pyrimidinyl, and pyridazinyl), five- or six-membered heteroaromatic rings containing one or two nitrogen atoms and, further, one sulfur atom (for example, thiazolyl and thiadiazolyl), and five- or six-membered heteroaromatic rings containing one or two nitrogen atoms (for example, pyrrolidinyl, piperidino, piperidyl, and pyperidinyl). At least one hydrogen atom on these rings may be optionally substituted, and examples of the substituent include lower alkyls. Specific examples of substituted or unsubstituted heterocyclic groups include pyridyl, thiadiazolyl, benzothiazolyl, and 2,2,6,6-tetramethylpiperidinyl.

A further group of dyes represented by the formula (XIII) which may be preferably used in the present invention include a group of dyes wherein m is 0 with at least one of $R^{301}$, $R^{302}$, and $R^{303}$ being a hydrogen atom, or at least one of $R^{301}$, $R^{302}$, and $R^{303}$ is a halogen-substituted alkyl group (most preferably a trifluoromethyl group), a substituted or unsubstituted carbamoyl, a substituted or unsubstituted sulfamoyl, a group —$SO_2R^{307}$ (wherein $R^{307}$ represents a lower alkoxy), a group —COOH, or a group —$COR^{308}$ (wherein $R^{308}$ represents a lower alkoxy). Further, dyes are preferred wherein these substituents are in the ortho position to the azo group.

A further group of dyes represented by the formula (XIII) which may be preferably used in the present invention include a group of dyes wherein the benzene ring in the formula (XIII) is a 2-carboxyphenyl group.

A further group of dyes represented by the formula (XIII) which may be preferably used in the present invention include a group of dyes wherein at least one of $R^{304}$, $R^{305}$, and $R^{306}$ is a group selected from $C_{1-18}$ alkyl, $C_{2-18}$ alkenyl, aryl, aralkyl, alicyclic, and heterocyclic groups and, at the same time, 1 to 4 carboxyl groups are present as a substituent. A more preferred group of dyes include a group of dyes wherein any one of $R^{304}$ and $R^{306}$ is a hydrogen atom with the other being a group selected from $C_{1-18}$ alkyl, $C_{2-18}$ alkenyl, aryl, aralkyl, alicyclic, and heterocyclic groups and, at the same time, 1 to 4 carboxyl groups are present as a substituent.

A further group of dyes represented by the formula (XIII) which may be preferably used in the present invention include a group of dyes wherein $R^{304}$ and $R^{305}$ each independently represent a mono-, di-, or tri-substituted phenyl group with the substituent being a substituted or unsubstituted $C_{1-9}$ alkyl, a $C_{1-9}$ alkoxy, a halogen atom, hydroxyl, a substituted or unsubstituted carbamoyl, a substituted or unsubstituted sulfamoyl, a substituted or unsubstituted amino, nitro, or a group —$SO_2R^{312}$, carboxyl, or a group —$COR^{313}$.

A further group of dyes represented by the formula (XIII) which may be preferably used in the present invention include a group of dyes wherein $R^{304}$ and $R^{305}$ each independently represent a mono-, di-, or tri-substituted phenyl group with the substituent being carboxyl, carbamoyl, an optionally $C_{1-4}$ alkyl-substituted sulfamoyl, or a group —$COR^{313}$ (wherein $R^{313}$ represents a $C_{1-4}$ alkoxy). Among this group of dyes, more preferred are dyes wherein at least one of $R^{304}$ and $R^{305}$ is a mono-, di-, or tri-carboxy substituted phenyl.

A further group of dyes represented by the formula (XIII) which may be preferably used in the present invention include a group of dyes wherein $R^{304}$ and $R^{305}$ each independently represent a mono-, di-, or tri-substituted phenyl group with the substituent being a straight-chain $C_{4-12}$ alkyl, amino, carbamoyl, an optionally $C_{4-9}$ alkyl mono- or di-substituted sulfamoyl, or a group —$COR^{313}$ (wherein $R^{313}$ represents a $C_{5-9}$ alkoxy). Among this group of dyes, more preferred are dyes wherein at least one of $R^{304}$ and $R^{305}$ is carboxyl, and further preferred are dyes wherein at least one of $R^{304}$ and $R^{305}$ is a mono-, di-, or tri-$C_{4-9}$ alkyl-substituted phenyl.

A further group of dyes represented by the formula (XIII) which may be preferably used in the present invention include a group of dyes wherein $R^{306}$ represents a hydrogen atom.

In the present invention, two groups —$SO_3H$'s on the naphthyl ring in the formula (XIII) are preferably at the 3,5- or 3,6-position.

A preferred embodiment of the present invention, the total number of groups —$SO_3H$ and —COOH (including those in the form of a salt or an ester) in the dye represented by the formula (XIII) is preferably up to 6, more preferably up to 5, and most preferably up to 4.

In the present invention, dyes represented by the formula (XIII) may be used in either a free form or a salt form. Examples of salts of dyes represented by the formula (XIII) include salts of alkali metals (for example, sodium, lithium, and potassium), salts of alkyl or hydroxyalkyl (generally lower alkyl or hydroxy lower alkyl) substituted (primary, secondary, tertiary, and quaternary) ammoniums, and salts of organic amines, such as alkyl or hydroxylalkyl (generally lower alkyl or hydroxy lower alkyl) amines, carboxy substituted alkyl (generally carboxy substituted lower alkyl) amines, and polyamines containing 2 to 10 $C_{2-4}$ alkyleneimino units. The dyes represented by the formula (XIII) may be used as a single salt or a mixture of a plurality of salts. Further, in the dyes represented by the formula (XIII), part of acid groups may be in a salt form with the other acid groups being in a free acid form.

Specific examples of most preferred dyes represented by the formula (XIII) which may be used in the present invention include the following dyes.

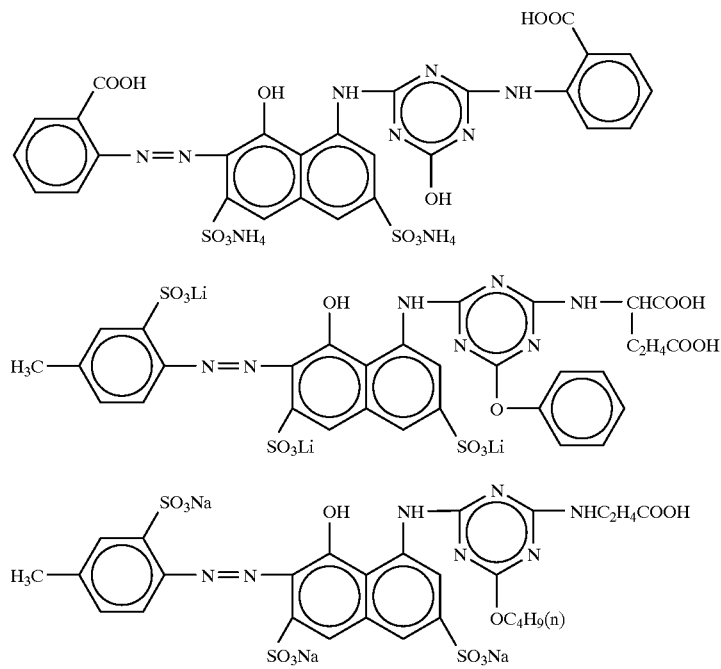

-continued
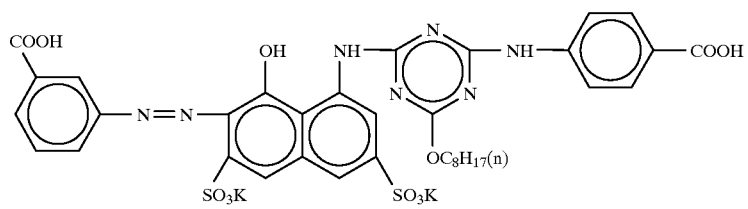
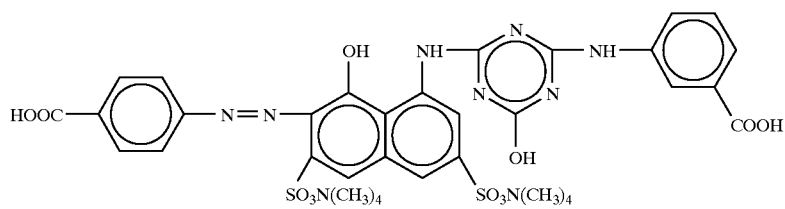
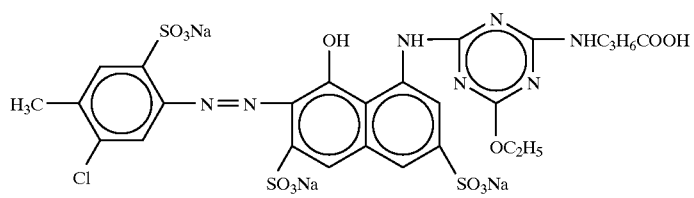
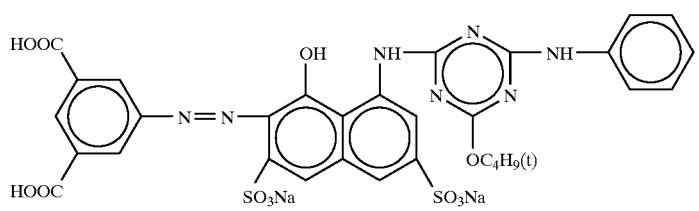
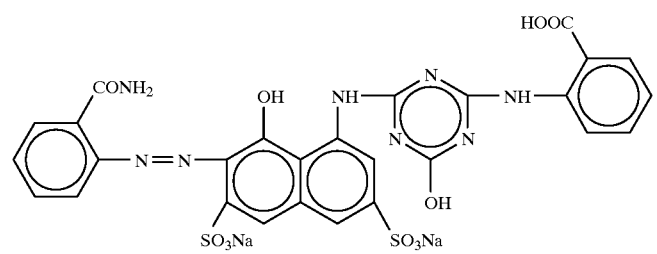
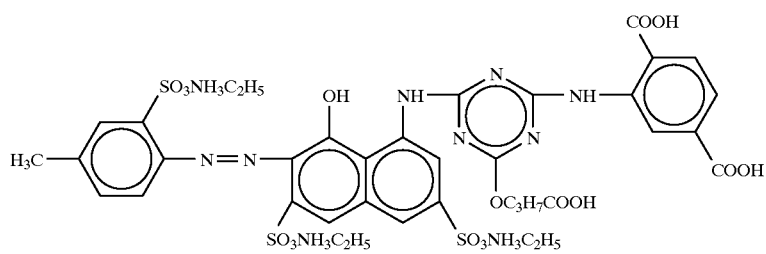
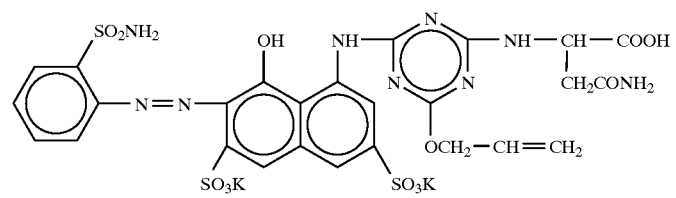

-continued
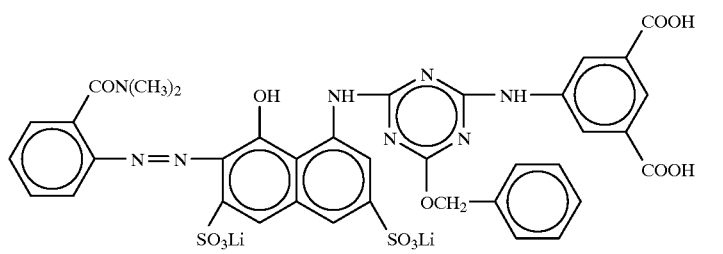
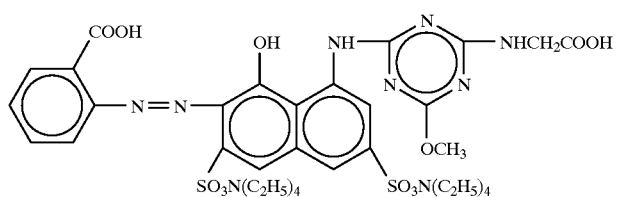
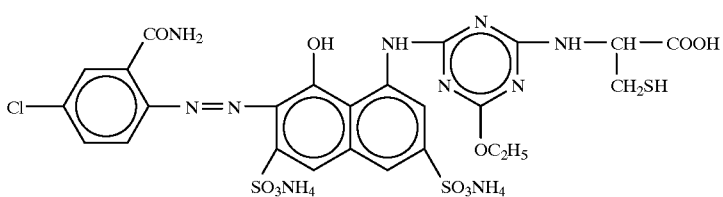
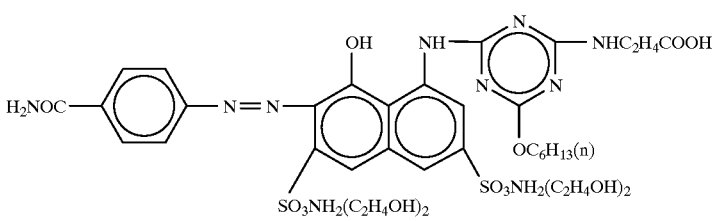
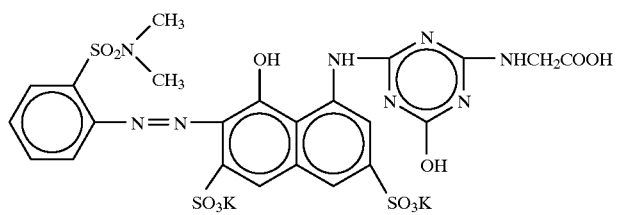
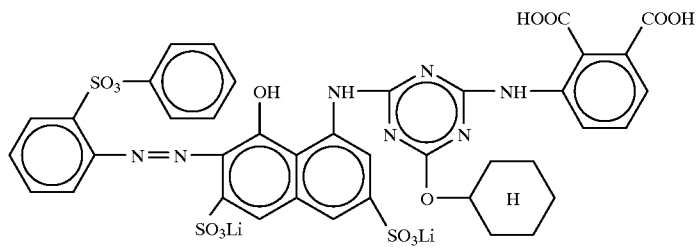
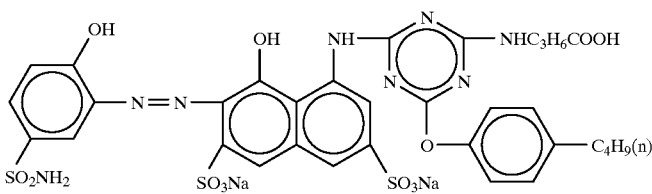

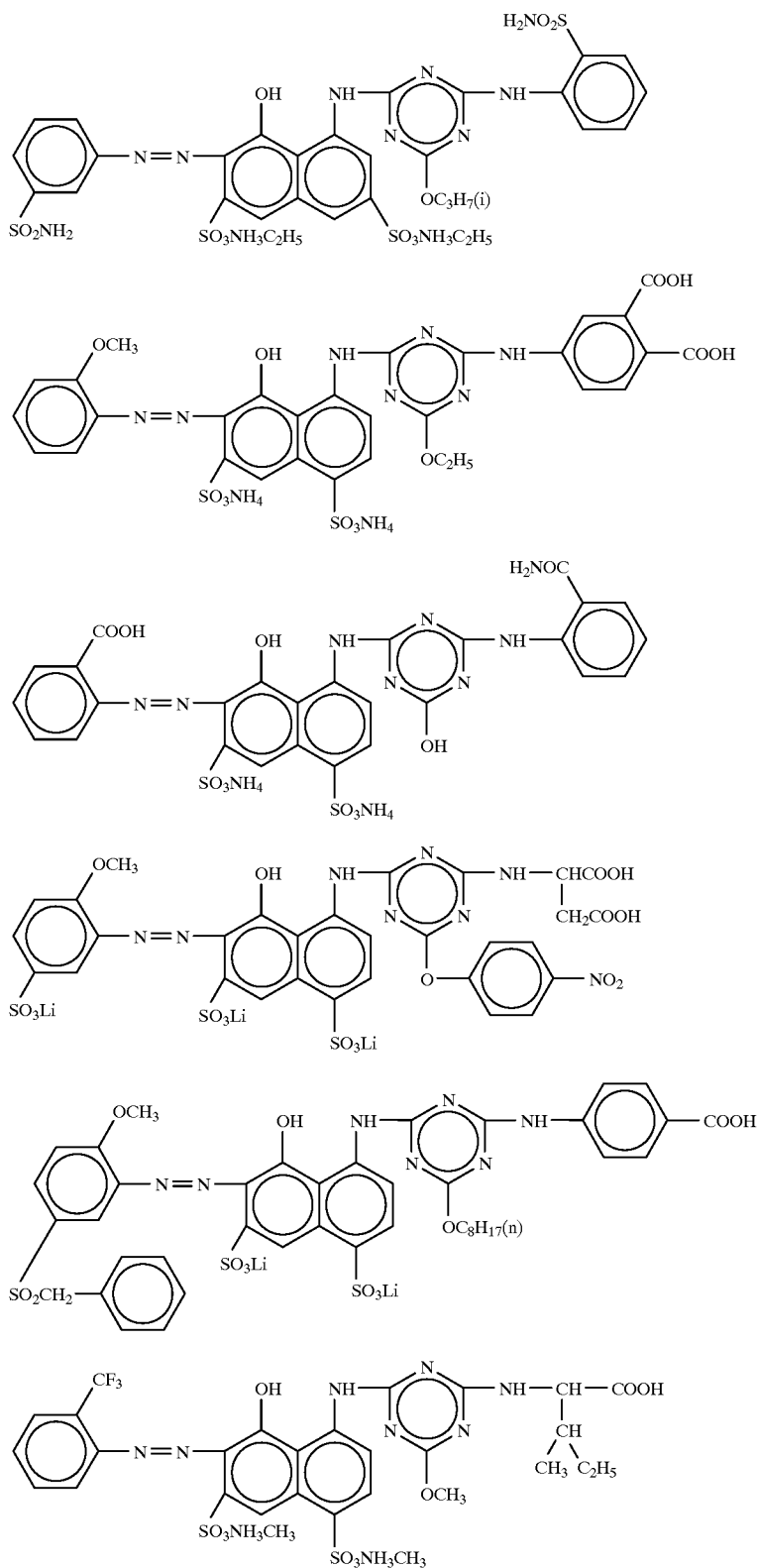

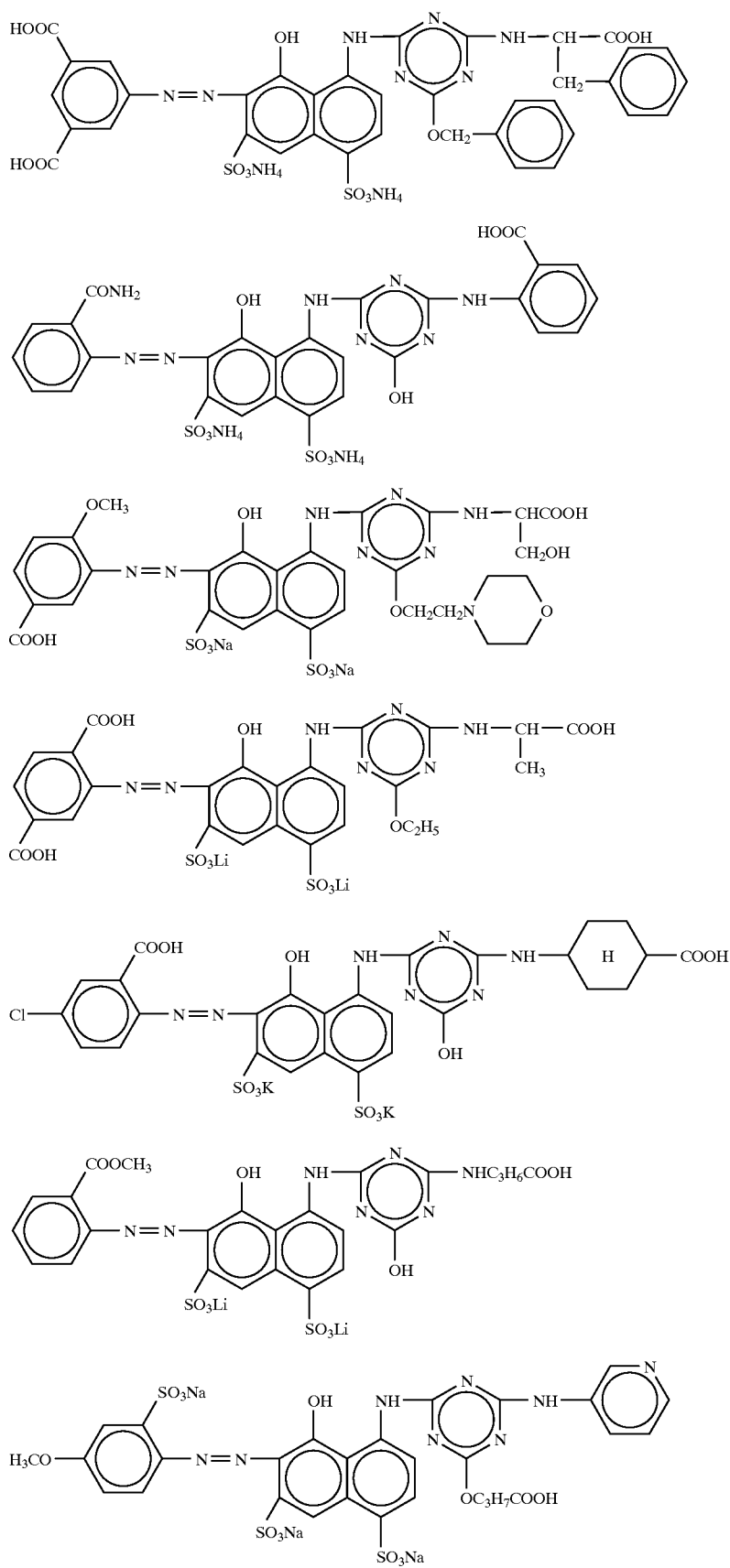

-continued
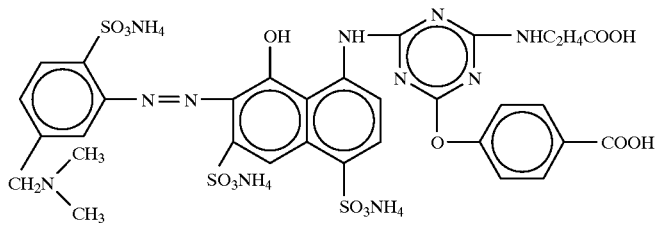
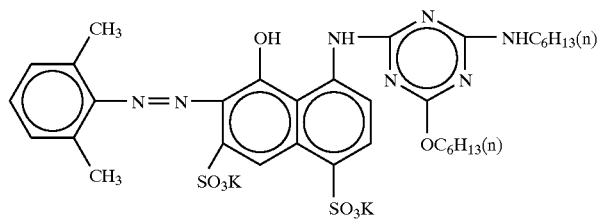
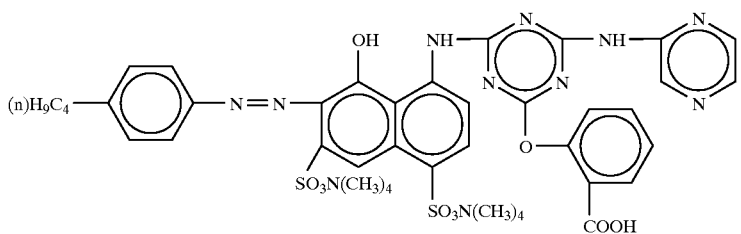
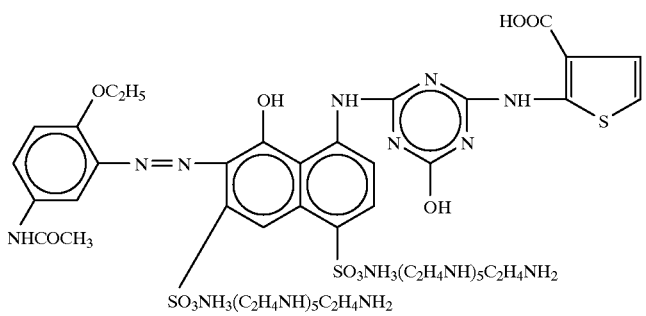
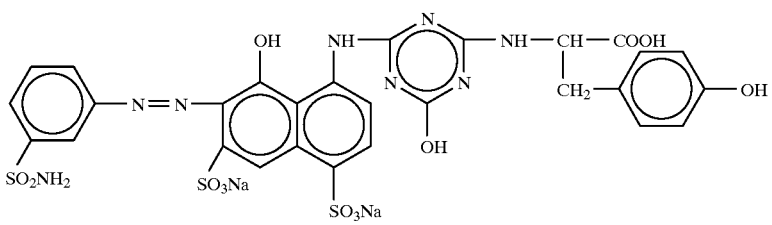
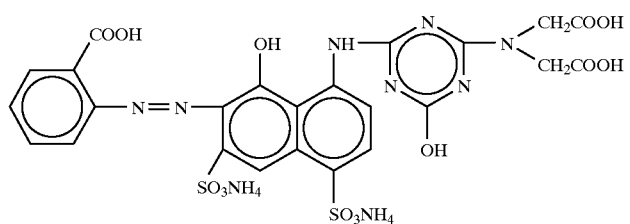
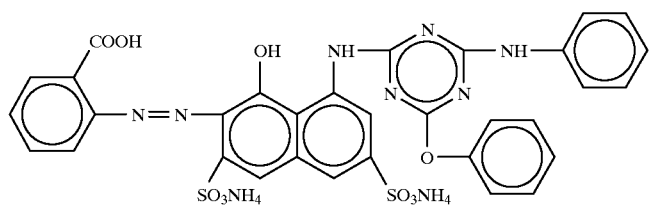

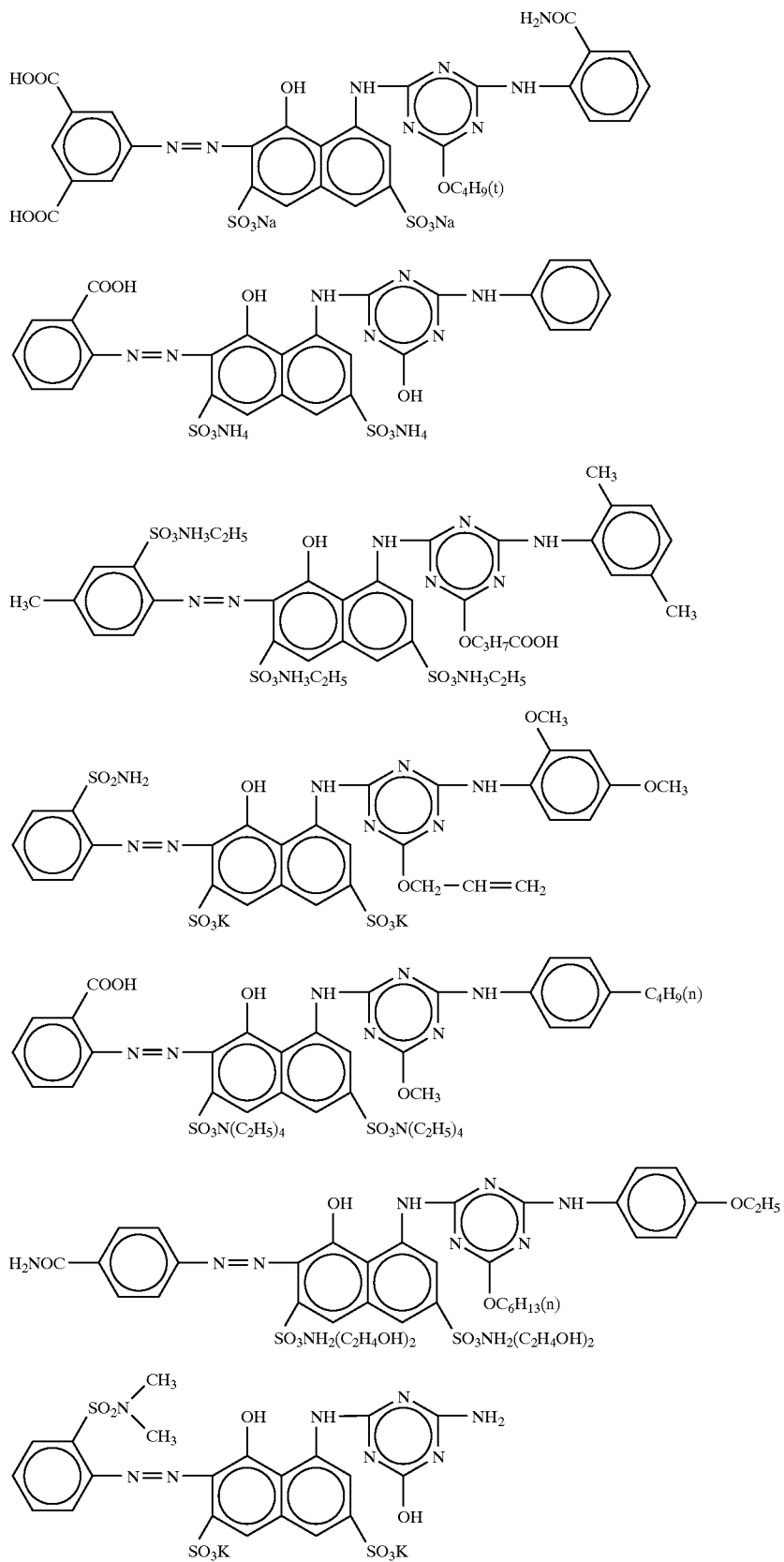

-continued
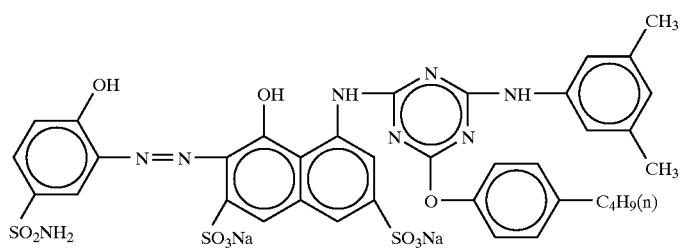
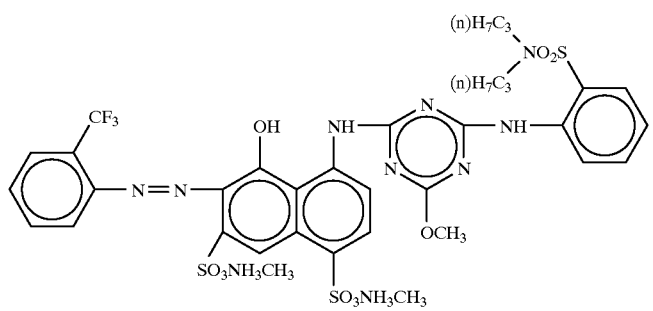
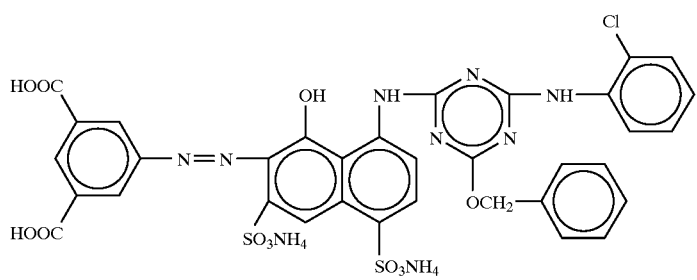
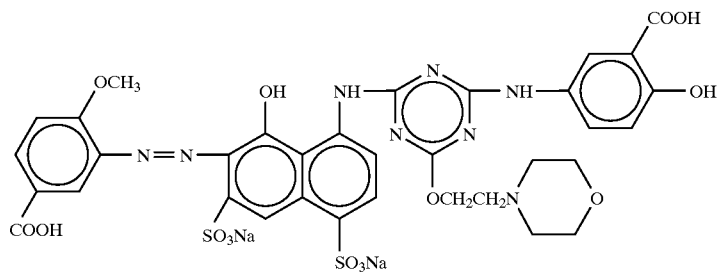
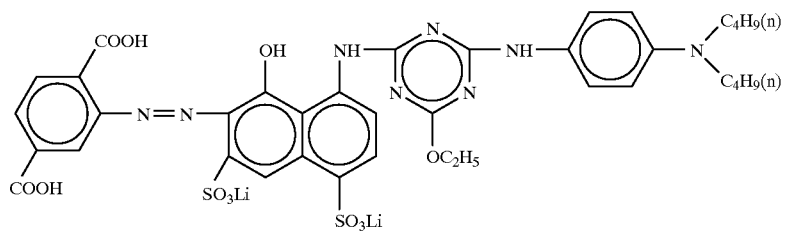
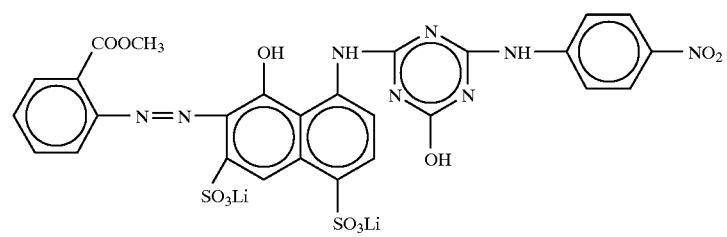

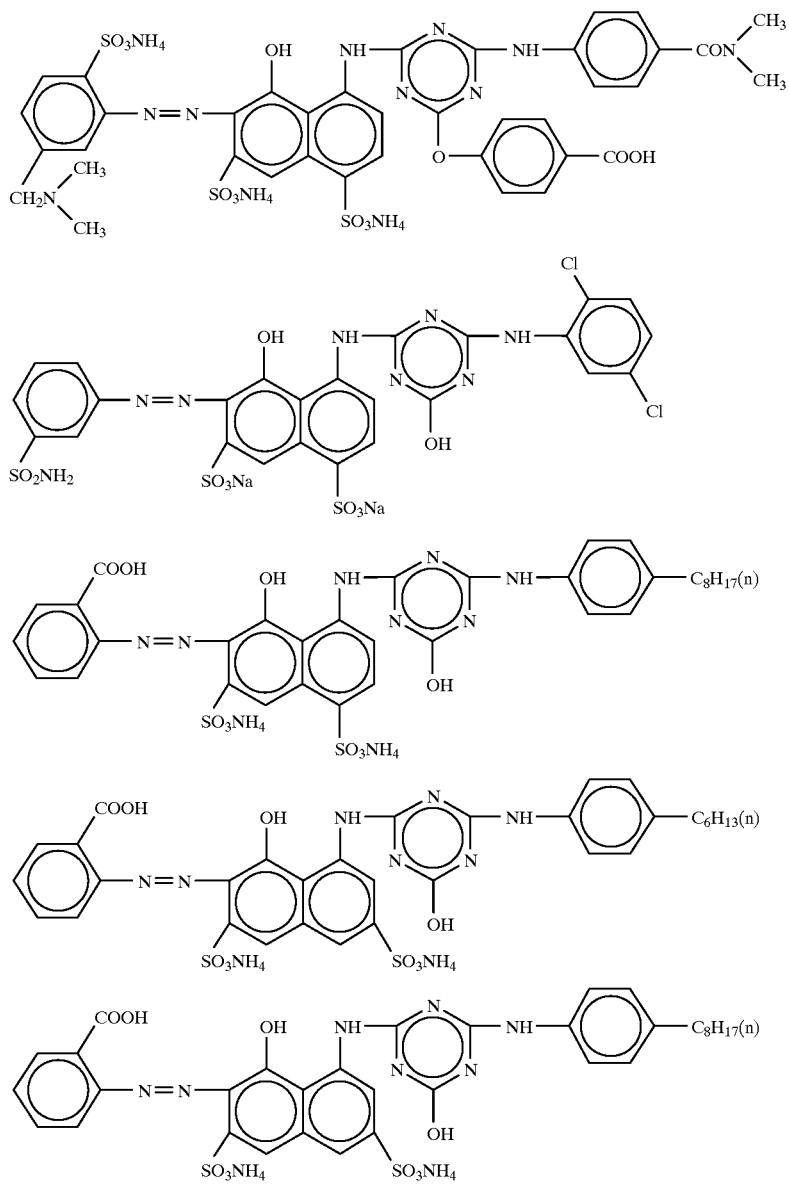
The dyes represented by the formula (XIII) are known in the art and may be synthesized by a process described in EP-682 088 A1.
Specific examples of preferred dyes represented by the formula (XIII) are as follows.
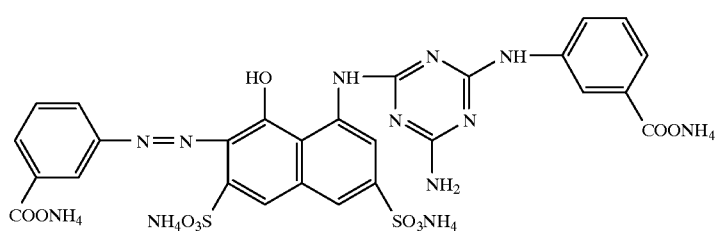
(M-1)

-continued
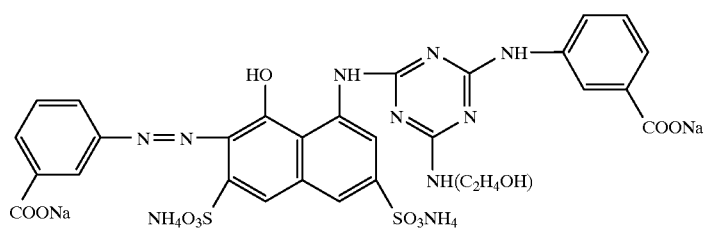
(M-2)
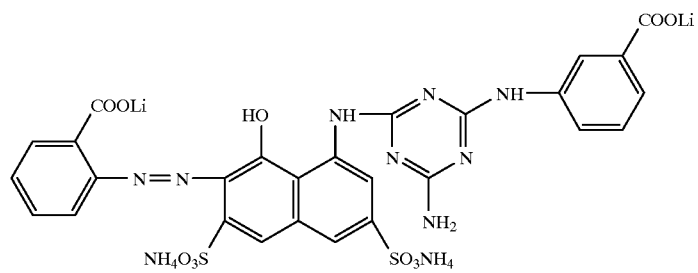
(M-3)
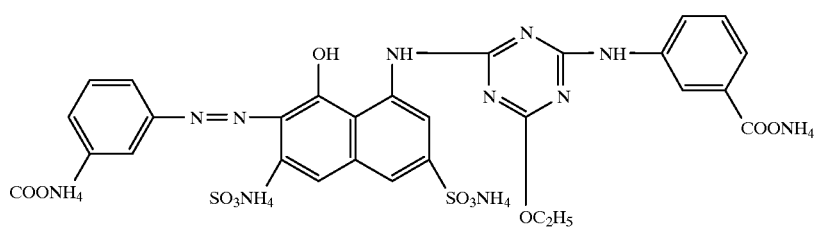
(M-4)
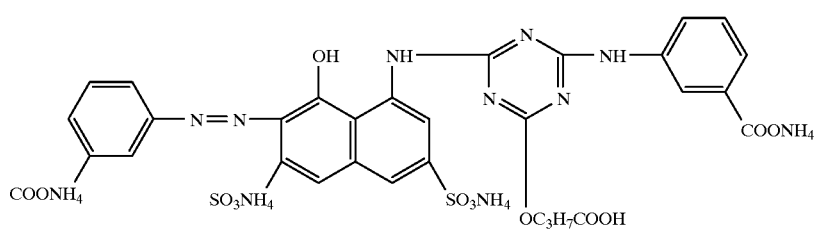
(M-5)
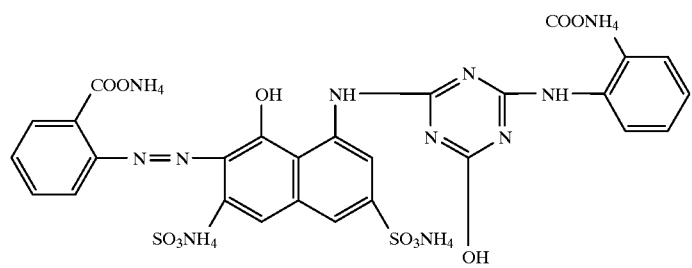
(M-6)
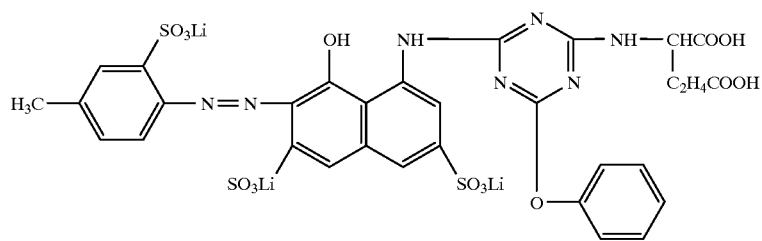
(M-7)

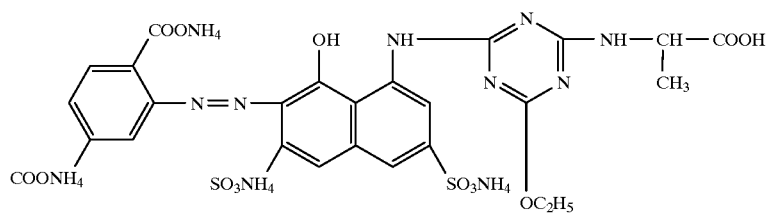
(M-8)
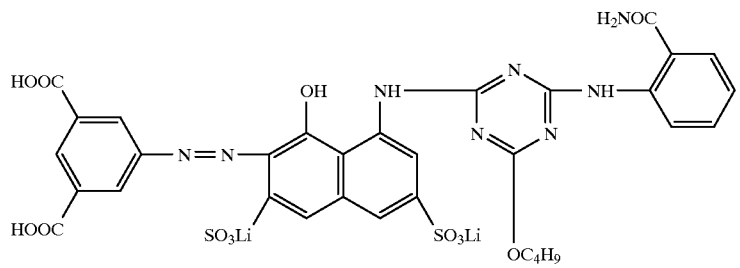
(M-9)
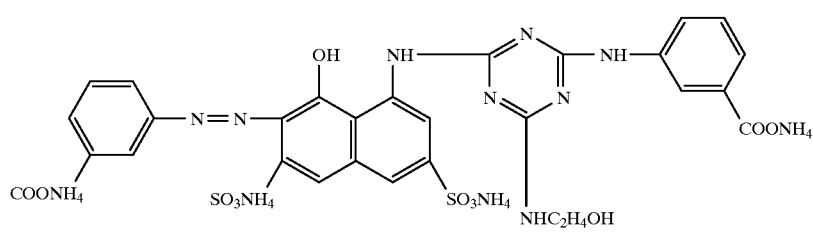
(M-10)
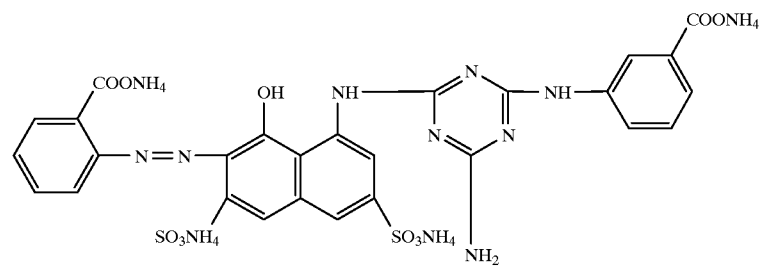
(M-11)
Specific examples of preferred dyes represented by the formula (XII) are as follows.

(M-12)
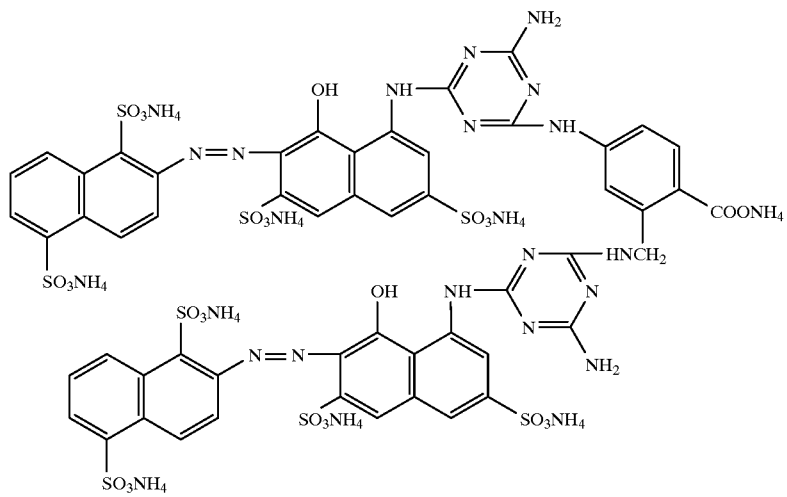
(M-13)
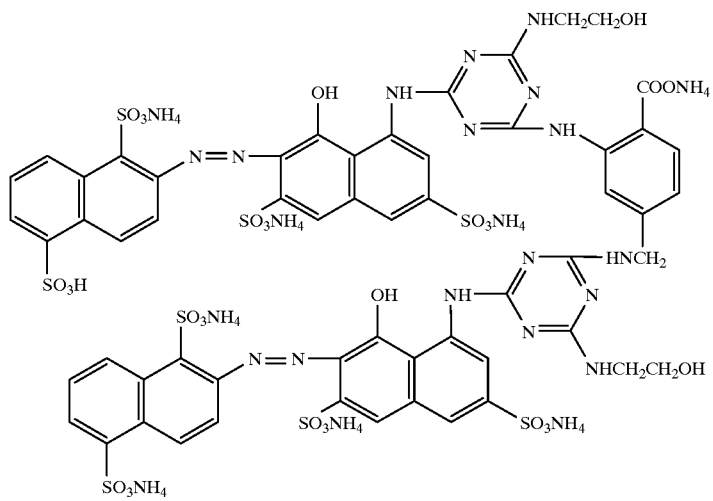
(M-14)
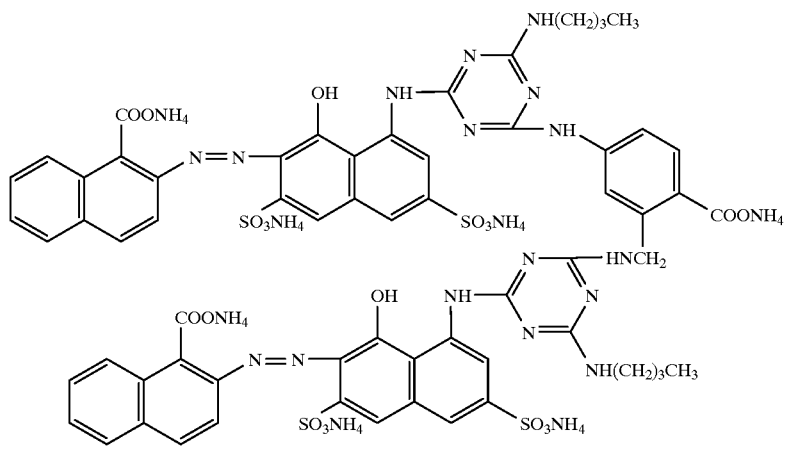
Further, in the formula (XIV), examples of azo chromophores represented by $D^1$ and $D^2$ include groups represented by the formula:

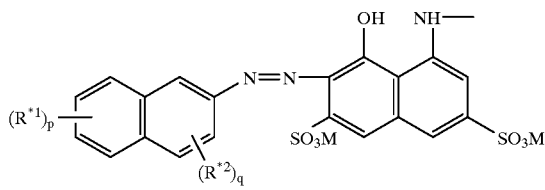

wherein $R^{*1}$ and $R^{*2}$ represent $-SO_3M$ or $-COOM$, M is as defined above and p and q are 0, 1 or 2.

The alkyl represented by $R^{401}$ $R^{402}$, $R^{403}$ and $R^{404}$ has preferably 1 to 9 carbon atoms, more preferably 1 to 4 carbon atoms. At least one hydrogen atom on the alkyl may be optionally substituted, and examples of the substituent include halogen atoms, a hydroxyl group, cyano, carboxyl, and $C_{1-6}$ alkoxys.

The alkyl represented by $R^{407}$ and $R^{408}$ is preferably a $C_{1-9}$ alkyl, more preferably a $C_{1-4}$ alkyl.

In the formula (XIV), M is as defined above.

C.I. Reactive Red 147 or C.I. Reactive Red 180 may be utilized as the colorant of the magenta ink composition according to the present invention.

The magenta ink composition according to the present invention basically comprises the above dye, water, and a water-soluble organic solvent.

Water-soluble organic solvents usable herein include those as described above in connection with the yellow ink composition. The amount of the water-soluble organic solvent added may be the same as that described above in connection with the yellow ink composition.

According to a preferred embodiment of the present invention, the magenta ink composition according to the present invention preferably contains at least one solvent, which is hygroscopic and solid at room temperature, selected from urea, trimethylolpropane, and trimethylolethane. The addition of these solvents is very effective in preventing nozzles being clogged with the dye. The amount of such solvents added is preferably about 2 to 20% by weight, more preferably 5 to 10% by weight.

In the magenta ink composition according to the present invention, other organic solvent components as described above in connection with the yellow ink composition may be added. The amount of such organic solvent components added may be the same as that described above in connection with the yellow ink composition.

As with the yellow ink composition, the magenta ink composition according to the present invention may further comprise a polyhydric alcohol lower alkyl ether. Preferred examples of polyhydric alcohol lower alkyl ethers usable herein include those as described above in connection with the yellow ink composition. The amount of such polyhydric alcohol lower alkyl ethers added may be the same as that described above in connection with the yellow ink composition.

Further, the magenta ink composition according to the present invention may contain an acetylene glycol represented by the above formula. Preferred examples and the amount of such acetylene glycol may be the same as those described above in connection with the yellow ink composition.

As with the yellow ink composition, the magenta ink composition according to the present invention can enjoy an advantage offered by the combination of the polyhydric alcohol lower alkyl ether with the acetylene glycol. This combined use enables the ink composition deposited onto a recording medium to quickly permeate into the recording medium, effectively preventing a deterioration in the print quality attributable to color-to-color mixing, between adjacent dots, which is a problem often found in color ink jet recording.

Also in the magenta ink composition according to the present invention, when the dyes represented by the formulae (XIII) and (XIV) have a group COOM, at least two components selected from the group consisting of (a) an amine having a boiling point of $-40°$ C. to $90°$ C., (b) an amine having a boiling point of $90°$ C. or above, and (c) an inorganic base may be contained in the ink composition. The addition of these components can realize the prevention of nozzles from being clogged and the waterfastness of the printed image on a higher level. The amount of these components and the pH of the ink composition may be the same as those described above in connection with the yellow ink composition.

As with the yellow ink composition, the magenta ink composition according to the present invention also may contain additional additives for improving various properties. Specific examples of preferred additives may include those as described above in connection with the yellow ink composition.

The magenta ink composition according to the present invention may be prepared by a conventional method. For example, necessary ingredients are thoroughly mixed together and dissolved in one another, and the solution is filtered through a membrane filter having a pore diameter of 0.8 $\mu$m and deaerated by means of a vacuum pump to prepare an ink.

Color Ink Set

The color ink set according to the present invention comprises a yellow ink composition, a magenta ink composition, and a cyan ink composition. The yellow ink composition and the magenta ink composition used herein are respectively the above-described yellow and magenta ink compositions according to the present invention.

Cyan Ink Composition Preferably Used in Ink Set

A cyan ink composition, which, when used in combination with the above yellow and magenta ink compositions according to the present invention, can realize a good image comprises a phthalocyanine dye or C.I. Direct Blue 199 as a colorant. The use of a cyan ink composition, containing the above cyan dye, in combination with the above yellow and magenta ink compositions offers good tone reproduction in each ink and, at the same time, when the yellow, magenta, and cyan inks are overprinted to form red, green, blue, and black, offers very good tone reproduction.

According to a preferred embodiment, the phthalocyanine dye is preferably one represented by the formula (XV).

In the formula (XV), the alkyl represented by $R^{501}$ is preferably a $C_{1-4}$ alkyl. The substituted alkyl represented by $R^{503}$ is preferably a $C_{1-4}$ alkyl, and examples of the substituent include hydroxyl and carboxyl groups. Further, the substituted alkyl represented by $R^{504}$ is preferably a $C_{1-4}$ alkyl, and examples of the substituent include hydroxyl and carboxyl groups. Examples of the substituent in the substituted phenyl represented by $R^{502}$ and $R^{504}$ include hydroxyl and carboxyl groups.

In the formula, M is as defined above; k and l are each independently 0 to 1, m is 1 to 4, provided that $2 \leq k+l+m \leq 4$; n is an integer of 0 to 15, provided that, when $R^{502}$ represents a hydroxyl group, n is an integer of 5 to 15.

Specific examples of dyes represented by the formula (XV) are as follows.

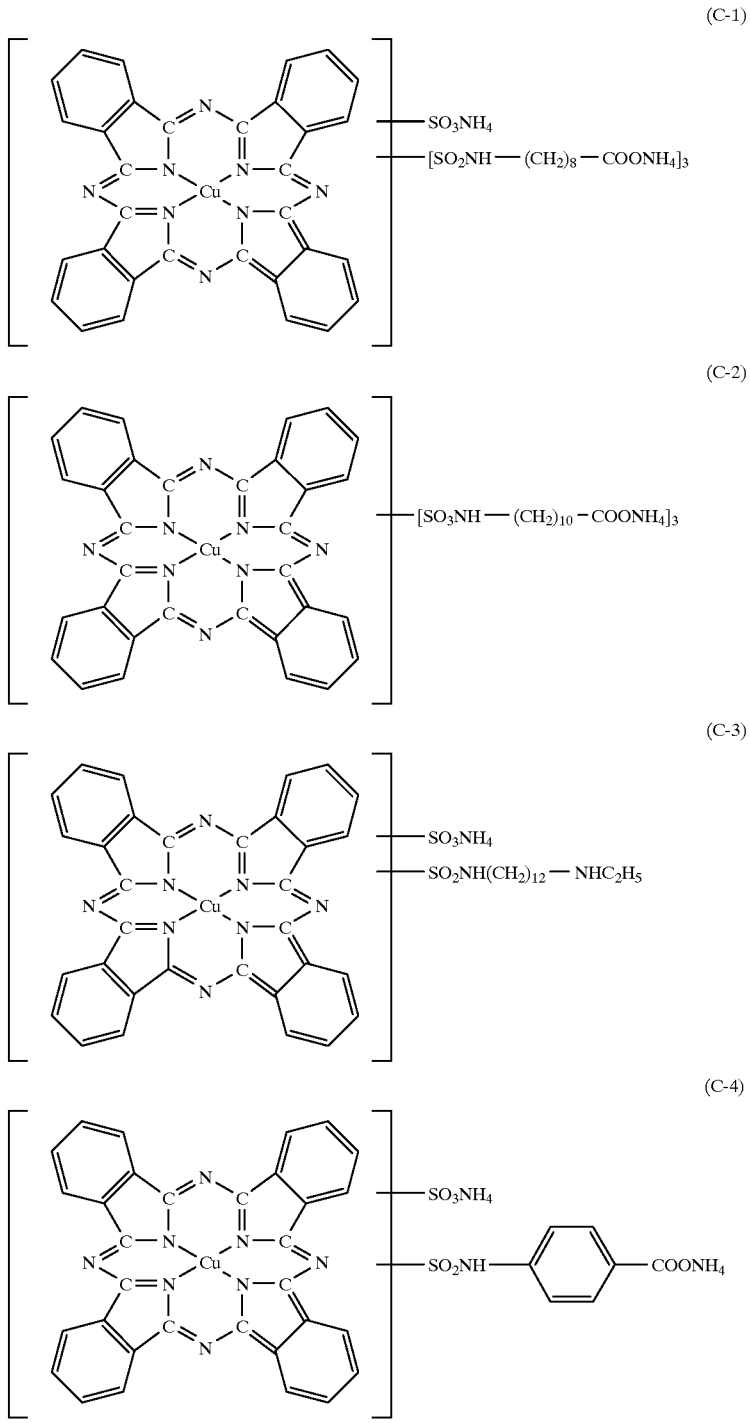

The content of the above dye in the cyan ink composition is 0.5 to 6.0% by weight or preferably about 1.5 to 6.0% by weight, more preferably 2.5 to 4.5% by weight.

The cyan ink composition basically comprises the above dye, water, and a water-soluble organic solvent.

Water-soluble organic solvents usable herein include those as described above in connection with the yellow ink composition. The amount of the water-soluble organic solvent added may be the same as that described above in connection with the yellow ink composition.

Also in the cyan ink composition, other organic solvent components as described above in connection with the yellow ink composition may be added. The amount of such organic solvent components added may be the same as that described above in connection with the yellow ink composition. As with the yellow ink composition, the cyan ink composition may further comprise a polyhydric alcohol lower alkyl ether. Preferred examples of polyhydric alcohol lower alkyl ethers usable herein include those as described above in connection with the yellow ink composition. The amount of such polyhydric alcohol lower alkyl ethers added may be the same as that described above in connection with the yellow ink composition.

Further, the cyan ink composition may contain an acetylene glycol represented by the above formula. Preferred examples and the amount of such acetylene glycol may be the same as those described above in connection with the yellow ink composition.

As with the yellow ink composition, the cyan ink composition can enjoy an advantage offered by the combination of the polyhydric alcohol lower alkyl ether with the acetylene glycol. This combined use enables the ink composition deposited onto a recording medium to quickly permeate into the recording medium, effectively preventing a deterioration in the print quality attributable to color-to-color mixing, between adjacent dots, which is a problem often found in color ink jet recording.

Also in the cyan ink composition, when the dyes represented by the formulae (XIII) and (XIV) have a group COOM, at least two components selected from the group consisting of (a) an amine having a boiling point of −40° C. to 90° C., (b) an amine having a boiling point of 90° C. or above, and (c) an inorganic base may be contained in the ink composition. The addition of these components can realize the prevention of nozzles from being clogged and the waterfastness of the printed image on a higher level. The amount of these components and the pH of the ink composition may be the same as those described above in connection with the yellow ink composition.

As with the yellow ink composition, the cyan ink composition also may contain additional additives for improving various properties. Specific examples of preferred additives may include those as described above in connection with the yellow ink composition.

The cyan ink composition may be prepared by a conventional method. For example, necessary ingredients are thoroughly mixed together and dissolved in one another, the solution is filtered through a membrane filter having a pore diameter of 0.8 μm and deaerated by means of a vacuum pump to prepare an ink.

Black Ink Composition Preferably Used in Ink Set

According to a preferred embodiment of the present invention, black ink compositions, which may be preferably used in combination with the yellow and magenta ink compositions according to the present invention, include the following three black ink compositions. The utilization of these black ink compositions can realize a good color image even on plain paper. Further, it can effectively prevent bleed attributable to color-to-color mixing in the region of boundary between colors, i.e., color bleed.

First Embodiment of Black Ink Composition

The first embodiment of the black ink composition comprises a first group of dyes and a second group of dyes.

A combination of these two groups of dyes results in faithful reproduction of black color and, at the same time, realizes waterfast prints. Further, it enables black color to be faithfully reproduced on paper, called "plain paper," used in offices, schools, and households, such as copying paper, memo pad, bond paper, letter paper, postcards, and voucher paper, and, at the same time, can realize waterfast prints.

The ratio of the first group of dyes to the second group of dyes in the ink composition may be suitably determined in such a range as will offer the above advantages. For example, the weight ratio of the first group of dyes to the second group of dyes in the ink composition is preferably in the range of from 1:0.1 to 1:0.5.

The amount of the dyes added to the ink composition also may be suitably determined in such an amount range as will offer the above advantages. For example, it is preferably about 1 to 25% by weight, more preferably about 2 to 10% by weight.

The first group of dyes are dyes represented by the formula (I) and comprises a dye wherein $R^1$ is in the m-position to the azo group and represents $PO(OM)_2$ and a dye wherein $R^1$ is in the m-position to the azo group and represents COOM.

In the formula (I), the $C_{1-4}$ alkoxy represented by X and Y is preferably a methoxy, ethoxy, or butoxy group.

Alkali metals represented by M in the formula (I) include, for example, lithium, sodium, and potassium. Organic amines represented by M include, for example, mono-, di-, or tri-lower alkyl-substituted (preferably, $C_{1-4}$ alkyl-substituted) amine, allylamine, morpholine, and piperidine. More specific examples thereof include methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, and dibutylamine.

According to a preferred embodiment of the present invention, the composition of the first group of dyes is such that, as analyzed by liquid chromatography, the area ratio of the peak area Sp of the dye represented by the formula (I) with $R^1$ being in the m-position to the azo group and representing $PO(OM)_2$ to the peak area Sc of the dye represented by the formula (I) with $R^1$ being in the m-position to the azo group and representing COOM, Sp: Sc, is in the range of from 1:0.6 to 1:1.5. The use of the above first group of dyes can realize an ink composition having excellent storage stability. More specifically, an ink composition free from precipitation of insolubles can be provided.

The dye, constituting the first group of dyes, represented by the formula (I) with $R^1$ being in the m-position to the azo group and representing $PO(OM)_2$ may be a disazo dyes, having a phosphoric acid group, embraced in a group of dyes disclosed in Japanese Patent Publication No. 80956/1993. Since this dye has a phosphoric acid group in its structure, it has a high capability of dying cellulose fibers such as paper and, at the same time, excellent waterfastness. Further, this dye possesses excellent solubility in an aqueous liquid medium because it has a water-soluble acid group such as a sulfonic acid group. The solubility in water varies depending upon pH of the aqueous medium. However, good solubility is provided in pH 7.5–11, preferably pH 8.5–10, and the dye is sparingly soluble in pH on the acid side. This dye can be synthesized, for example, by the following method. Specifically, m-aminobenzenephosphonic acid is diazotated by a conventional method and subjected to coupling with 2,5-di-$C_{1-4}$ alkoxy-substituted aniline to give a monoazo compound having an amino group. The monoazo compound, after isolation or as such, is diazotated by a conventional method and subjected to coupling with γ acid (2-amino-8-naphthol-6-sulfonic acid) to give the contemplated dye.

The dye, constituting the second group of dyes, represented by the formula (I) with $R^1$ being in the m-position to the azo group and representing COOM may be a diazo dye, having a carboxylic acid group, disclosed in Japanese Patent Laid-Open Nos. 262998/1993 and 125318/1993. Since this dye has a carboxylic acid group in its structure, it has good waterfastness. Further, since this dye has a water-soluble acid group, such as a sulfonic acid group, it dissolves as an alkali metal salt or an ammonium salt in an aqueous liquid medium. It is insoluble when the pH of the aqueous liquid medium is not more than 6. Good solubility is provided in pH 8.0–10. This dye can be synthesized, for example, by the following method. Specifically, m-aminobenzenecarboxylic acid is diazotated by a conventional method and subjected to coupling with 2,5-di-$C_{1-4}$ alkoxy-substituted aniline to give a monoazo compound having an amino group. The monoazo compound, after isolation or as such, is diazotated by a conventional method and subjected to coupling with γ acid (2-amino-8-naphthol-6-sulfonic acid) to give the contemplated dye.

Specific examples of dyes represented by the formula (I) with $R^1$ being in the m-position to the azo group and representing $PO(OM)_2$ and dyes represented by the formula (I) with $R^1$ being in the m-position to the azo group and representing COOM, which may be preferably used in the present invention, are as follows.

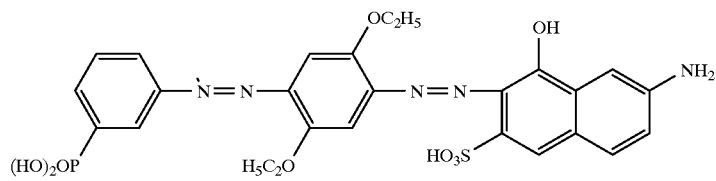
(I-1)

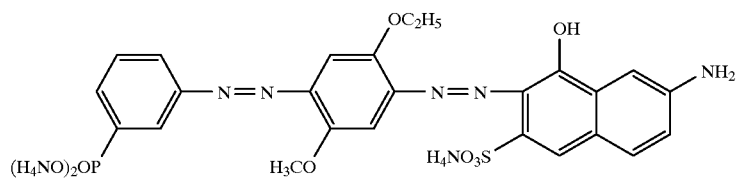
(I-2)

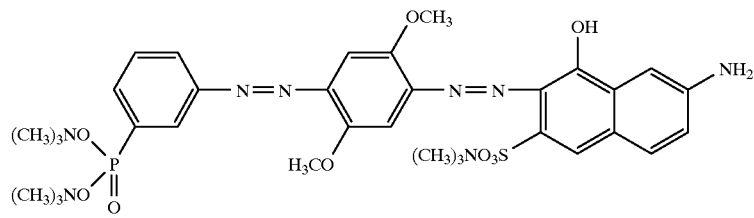
(I-3)

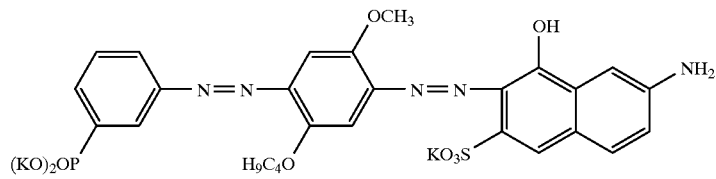
(I-4)

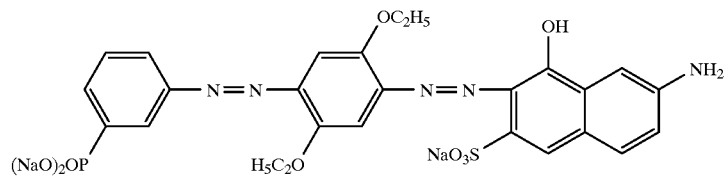
(I-5)

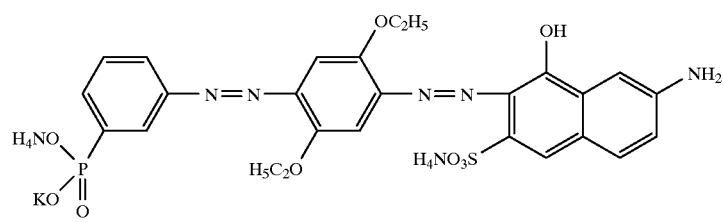
(I-6)

(I-7)
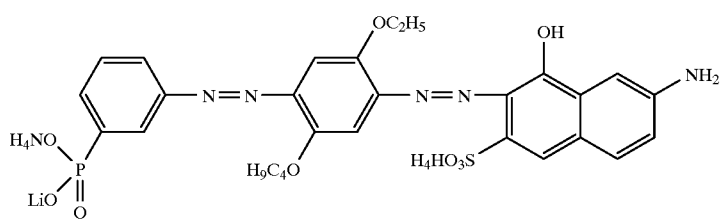
(I-8)
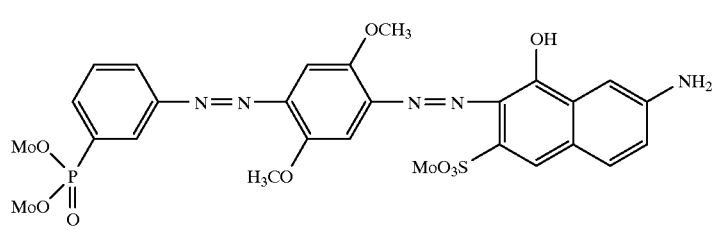
Mo = morpholinium
(I-9)
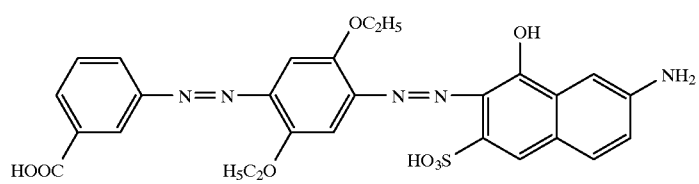
(I-10)
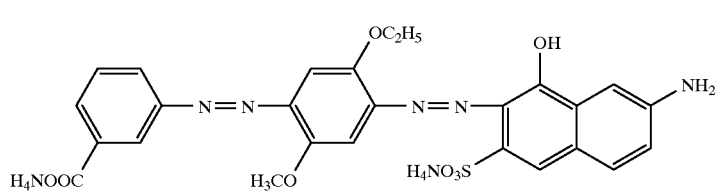
(I-11)
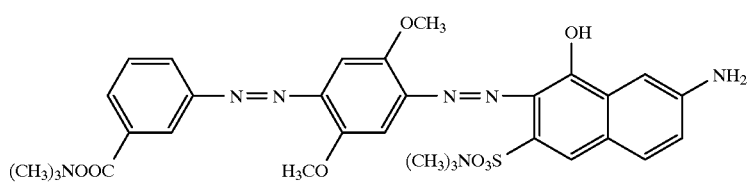
(I-12)
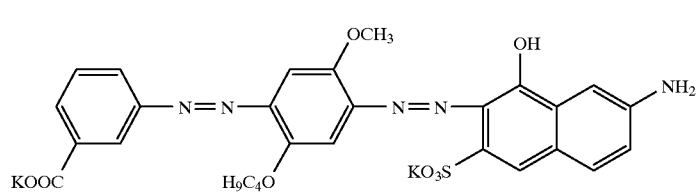
(I-13)
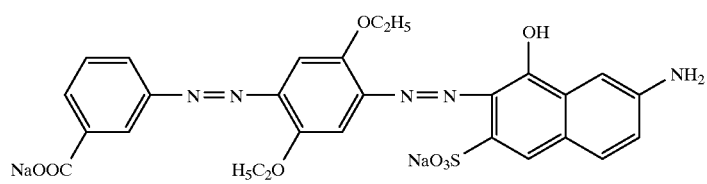

-continued
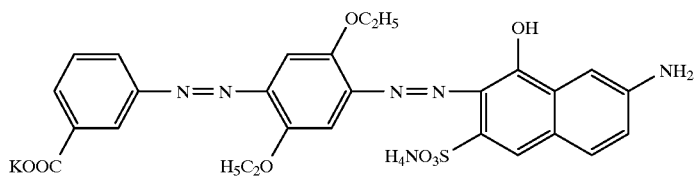
(I-14)
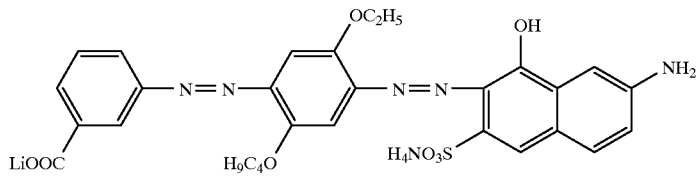
(I-15)
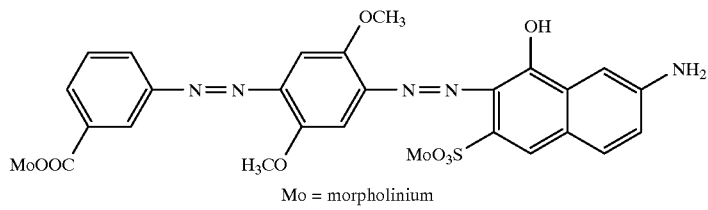
Mo = morpholinium
(I-16)
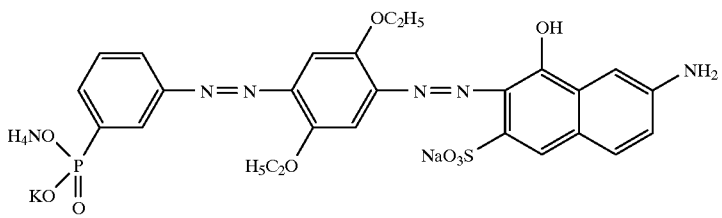
(I-17)
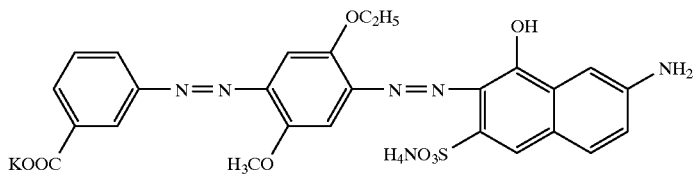
(I-18)
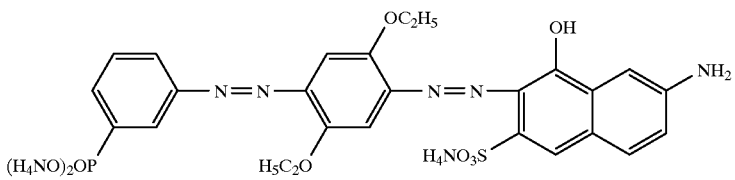
(I-19)
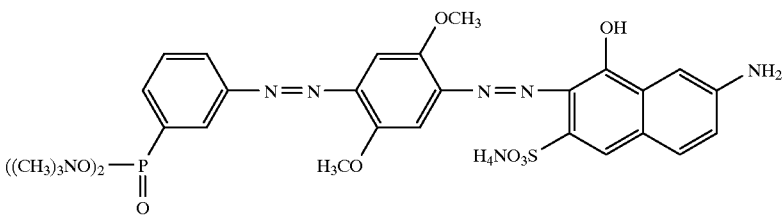
(I-20)

(I-21)
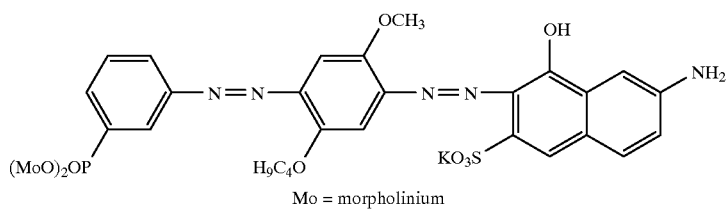

(I-22)
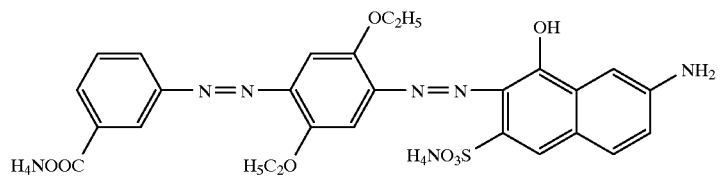

(I-23)
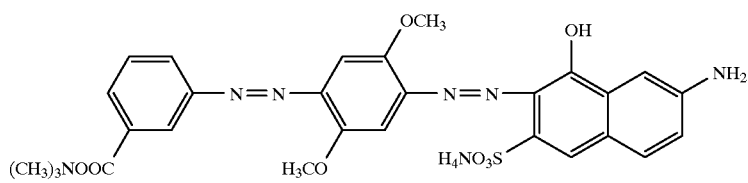

(I-24)
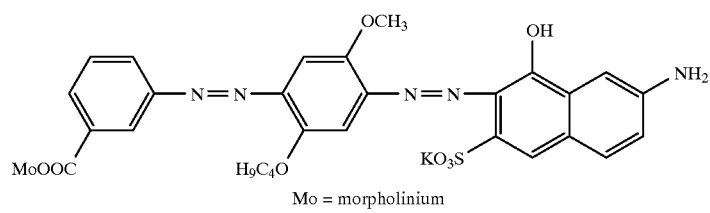

The above two dyes constituting the first group of dyes may be separately synthesized and then mixed with each other. Alternatively, they may be simultaneously synthesized as a mixture. Such simultaneous synthesis may be performed, for example, by the following scheme.

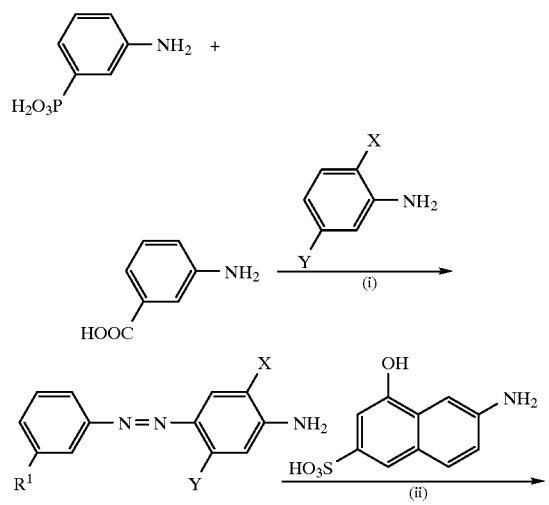

In the step (i), m-aminobenzenephosphonic acid and m-aminobenzenecarboxylic acid in the form of a mixed amine are simultaneously diazotated at a temperature of, for example, 0 to 5° C. Then, in the step (ii), the diazotated compounds are then subjected to a coupling reaction with 2,5-dialkoxy-substituted aniline, for example, at a temperature of 0 to 5° C. and pH 0.5 to 3.5. In the step (iii), the resultant monoazo compounds are diazotated, for example, at a temperature of 25 to 35° C. and then subjected to a coupling reaction with γ acid (2-amino-8-naphthol-6-sulfonic acid) at a temperature of 5 to 15° C. and pH 9 to 10.

The second group of dyes used in the first embodiment of the black ink composition comprise a dye represented by the formula (II) and/or a dye represented by the formula (III).

The dyes belonging to the second group of dyes are known in the art and described, for example, in Japanese Patent Laid-Open No. 233975/1992 and Color Index (THE SOCIETY OF DYES AND COLOURISTS).

Specific examples of dyes which are embraced in the second group of dyes and may be preferably used in the present invention are as follows.

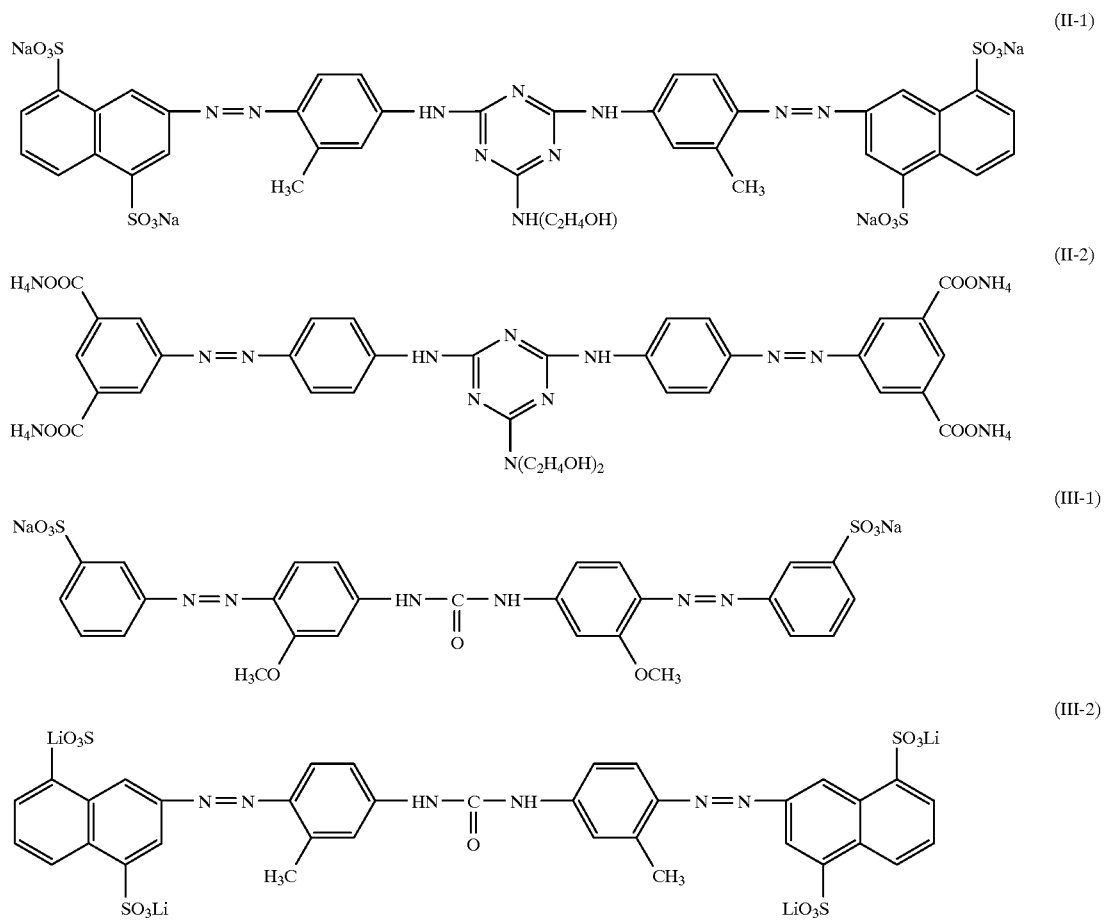

According to a preferred embodiment of the present invention, M in the formula (I) represents a cation of a volatile compound with M in the formula (II) and/or (III) being a cation of an alkali metal. This combination is preferred from the viewpoints of waterfastness of the printed image and prevention of clogging of nozzles. Volatile compounds usable herein include ammonium, methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine, allylamine, morpholine, piperidine, and mixtures thereof.

The first embodiment of the black ink composition basically comprises the above groups of dyes, water, and an organic solvent.

According to a preferred embodiment of the present invention, a nitrogen-containing cyclic compound and a polyhydric alcohol as the organic solvent are used in combination with the above group of dyes.

The addition of the nitrogen-containing cyclic compound can stabilize the dissolution of the dyes and, at the same time, can prevent clogging of nozzles, resulting in stable printing. Further, it advantageously aids the color development of the dyes and improves the waterfastness of the printed image. The amount of the nitrogen-containing cyclic compound added is preferably about 1 to 30% by weight, more preferably 3 to 20% by weight. Specific examples of nitrogen-containing cyclic compounds usable herein include 1,3-dimethyl-2-imidazolidinone, 2-pyrrolidone, N-methyl-2-pyrrolidone, ε-caprolactam, and mixtures thereof.

The addition of the polyhydric alcohol offers an advantage that clogging of nozzles can be more effectively prevented. The amount of the polyhydric alcohol added is preferably about 1 to 30% by weight, more preferably 3 to 20% by weight. Specific examples of polyhydric alcohols usable herein include ethylene glycol, diethylene glycol, triethylene glycol, polyethylene glycol, propylene glycol, 1,3-propanediol, 1,5-pentanediol, 1,2,6-hexanetriol, glycerin, and mixtures thereof.

Preferably, the first embodiment of the black ink composition comprises a nonionic acetylene glycol surfactant. The addition of nonionic acetylene glycol surfactant can advantageously offer quick fixation (penetration) of the ink and, at the same time, enables one dot to be kept circular.

Specific examples of nonionic acetylene glycol surfactants usable herein include, for example, Surfynol 465, Surfynol 104, and Olfine STG (trade names, all marketed by Nissin Chemical Industry Co., Ltd.). Among them, Olfine STG is effective. The amount of the nonionic acetylene glycol surfactant added is preferably 0.05 to 3% by weight, more preferably 0.5 to 2% by weight.

Preferably, the first embodiment of the black ink composition contains a glycol ether. The addition of the glycol ether can further increase the penetration of the ink and, at the same time, can reduce the bleed in the boundary between adjacent color inks in color printing, offering a very sharp image.

Glycol ethers usable herein include, for example, ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether added thereto is preferably about 3 to 30% by weight, more preferably 5 to 15% by weight.

According to a preferred embodiment of the present invention, the pH of the ink composition is adjusted by the addition of tri(hydroxyalkyl)amine. Possible pH adjustment methods include a method using an inorganic base, such as KOH or NaOH, and a method using an organic base, such as an amine. In the case of an inorganic base, pH, in some cases, rapidly increases when the amount thereof exceeds a certain level, making it difficult to control the pH. Further, since the inorganic base is solid, it per se precipitates in the ink composition, causative of clogging of nozzles. Further, in the organic base, since the nitrogen atom is positively charged, there is a fear of causing a reaction with dyes. In using any of the inorganic and organic bases, care should taken so as not to cause the above problems. On the other hand, tri(hydroxyalkyl)amine is less likely to cause such problems, and, hence, the use thereof is preferred. Although the amount of the tri(hydroxyalkyl)amine added may be suitably determined by taking into consideration contemplated pH and other properties of the ink composition, it is preferably about 0.1 to 2% by weight, more preferably about 0.3 to 1% by weight.

Further, according to a preferred embodiment of the present invention, the ink composition contains the tri(hydroxyalkyl)amine in combination with at least one hydroxide of metal element selected from the group consisting of the group Ia metal elements of the periodic table. This hydroxide belongs to the above inorganic base. However, the use thereof in combination with the tri(hydroxyalkyl)amine results in further quick resumption of normal printing after clogging. Further, this combination offer an additional advantage that the occurrence of precipitate can be reduced and the pH can remain unchanged, as compared with the pH adjustment using the inorganic base alone. Preferred metal oxides include LiOH, NaOH, KOH because they have high solubility in water. The amount of the metal oxide added may be suitably determined in such an amount range as will improve the properties of the ink, particularly the quick resumption of normal printing after clogging. However, it is preferably about 0.01 to 1% by weight.

The first embodiment of the black ink composition may further comprise an additional dye(s) so far as such dye(s) is not detrimental to the effect of waterfastness and faithful reproduction of black color. Further, if necessary, water-soluble compounds, such as lower alcohols and sodium alginate, water-soluble resins, fluorosurfactants, antimolds, rust preventives and the like may be added to the ink composition.

When the ink composition according to the present invention is used in ink-jet recording, in order to realize good response, ejection stability, suitable spread of dot, and good circularity of the dot, properties of the ink composition are such that the viscosity of the ink composition is preferably not more than 30 mPa.sec, more preferably 1.2 to 20 mPa.sec, at a service temperature of 0 to 50° C., and the surface tension of the ink composition is about 20 to 40 mN/m at a service temperature of 0 to 50° C.

The first embodiment of the black ink composition can be prepared by a conventional method. For example, necessary ingredients are thoroughly mixed together and dissolved in one another, the solution is filtered through a membrane filter having a pore diameter of 0.8 μm and deaerated by means of a vacuum pump to prepare an ink.

Second Embodiment of Black Ink Composition

The second embodiment of the black ink composition comprises a dye represented by the formula (I), wherein $R^1$ is in the m-position to the azo group and represents $PO(OM)_2$ or COOM, and a dye represented by the above formula (VI).

A combination of these two groups of dyes results in faithful reproduction of black color and, at the same time, realizes waterfast prints.

Further, it enables black color to be faithfully reproduced on paper, called "plain paper," used in offices, schools, and households, such as copying paper, memo pad, bond paper, letter paper, postcards, and voucher paper, and, at the same time, can realize waterfast prints.

The ratio of the dye represented by the formula (I) to the dye represented by the formula (VI) in the ink composition may be suitably determined in such a range as will offer the above advantages. For example, the weight ratio of the dye represented by the formula (I) to the dye represented by the formula (VI) in the ink composition is in the range of from 4:1 to 1:10, more preferably 3:1 to 1:5.

The amount of the dyes added to the ink composition also may be suitably determined in such an amount range as will offer the above advantages. For example, it is preferably about 1 to 20% by weight, more preferably about 1 to 10% by weight.

Dyes, represented by the formula (I), used in the second embodiment of the black ink composition may be as defined above in connection with the first embodiment of the black ink composition. Further, preferred specific examples thereof may also be the same as those described above in connection with the first embodiment of the black ink composition. Therefore, they include the above dyes (I-1) to (I-24). Further, in the second embodiment of the black ink composition, the dye represented by the formula (I) may be any of the dye represented by the formula (I) with $R^1$ being in the m-position to the azo group and representing $PO(OM)_2$ and the dye represented by the formula (I) with $R^1$ being in the m-position to the azo group and representing COOM.

According to a preferred embodiment of the present invention, M in the formula (I) is preferably a volatile alkali salt, such as ammonium, substituted ammonium, morpholinium, or piperidinium, because the waterfastness of the printed image can be improved. Examples of amines usable in the formation of such salts include methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine, allylamine, morpholine, piperidine, and mixtures thereof. In this connection, it should be noted that the dye represented by the formula (I) may not be completely in the form of ammonium salt, substituted ammonium salt, morpholinium salt, or piperidinium salt and may be a mixture of such salt with an alkali metal salt. In this case, the amount of the alkali metal salt is preferably not more than 50% based on the whole dye.

The dyes represented by the formula (VI) used in the second embodiment of the black ink composition are known dyes described in U.S. Pat. Nos. 4,963,189 and 5,203,912.

Specific examples of preferred dyes represented by the formula (VI) include the following dyes.

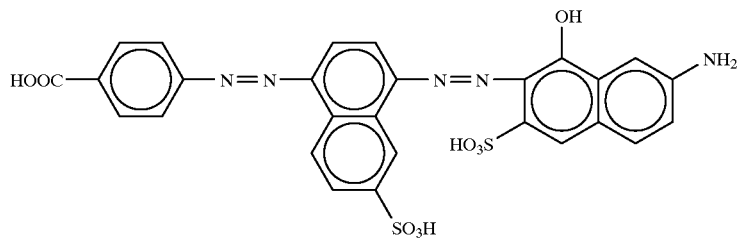
(VI-1)
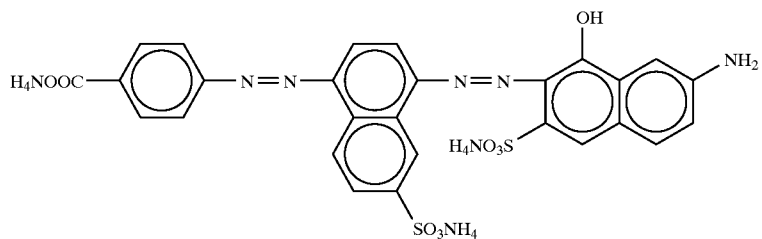
(VI-2)
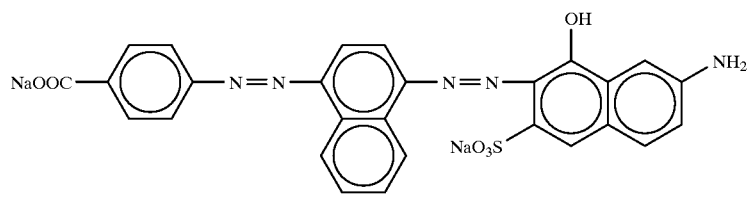
(VI-3)
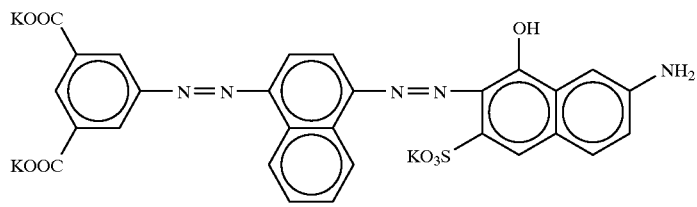
(VI-4)
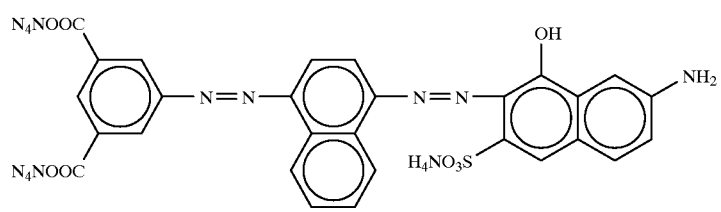
(VI-5)
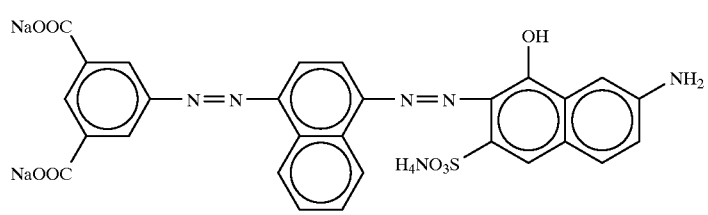
(VI-6)

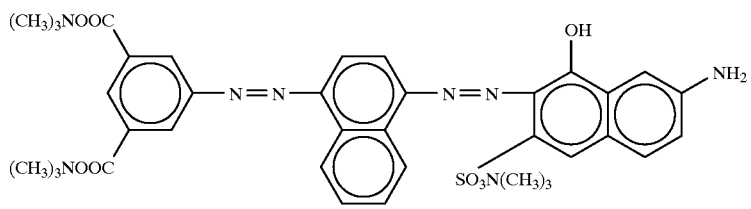

(VI-7)

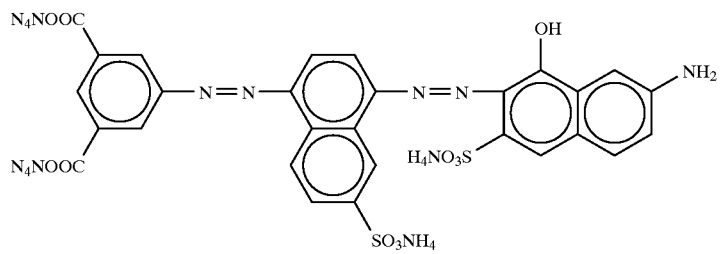

(VI-8)

As described above, the dyes represented by the formula (VI) are described in U.S. Pat. Nos. 4,963,189 and 5,203,912. Therefore, they may be prepared by reference to the description of these U.S. patents. Further, they may be prepared by the methods described in Japanese Patent Laid-Open No. 140270/1990 and Color Index, Third Edition, The Society of Dyers and Colourists.

As is known from Japanese Patent Publication No. 80956/1993, Japanese Patent Laid-Open Nos. 262998/1993 and 125318/1993, U.S. Pat. Nos. 4,963,189 and 5,203,912 and the like, the ink composition, to which the dyes represented by the formulae (I) and (VI) are added, should be basic in order to dissolve them. Therefore, the ink composition of the present invention also is preferably adjusted to pH on the basic side. According to a preferred embodiment, the pH value of the ink composition is preferably in the range of from 8.5 to 11, more preferably in the range of from 8.5 to 10.

This embodiment of the black ink composition comprises the above group of dyes, water, and an organic solvent.

According to a preferred embodiment, the addition of a glycol ether is preferred from the viewpoint of offering rapid fixation (penetration) of the ink and, at the same time, preventing the occurrence of bleed in color printing. Specific examples of glycol ethers usable herein include ethylene glycol monobutyl ether, diethylene glycol monobutyl ether, triethylene glycol monobutyl ether, propylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether added may be suitably determined in such an amount range as will provide the effect of the penetration of the ink and preventing the bleed. Since, however, the dyes represented by the formula (I) and the dyes represented by the formula (IV) are sparingly soluble or insoluble in the glycol ether, the addition thereof in an excessive amount leads to a fear of clogging of nozzles. Therefore, the amount of these dyes added is preferably about 3 to 30% by weight, more preferably about 5 to 15% by weight.

In the second embodiment of the black ink composition, the addition of a nonionic acetylene glycol surfactant is preferred for the same reason as described above in connection with the first embodiment of the black ink composition. Specific examples of nonionic acetylene glycol surfactants usable herein include those described above in connection with the first embodiment of the black ink composition. Although the amount of the nonionic acetylene glycol surfactant added may be suitably determined, it is preferably about 0.05 to 5% by weight, more preferably about 0.1 to 2% by weight.

For the same reason as described above in connection with the first embodiment of the black ink composition, the pH value of this embodiment of the black ink composition is adjusted by the addition of the tri(hydroxyalkyl)amine. The amount of the tri(hydroxyalkyl)amine added may be the same as that described above in connection with the first embodiment of the black ink composition.

Further, for the same reason as described above in connection with the first embodiment of the black ink composition, this embodiment of the black ink composition preferably contains the tri(hydroxyalkyl)amine in combination with at least one hydroxide of metal element selected from the group consisting of the group Ia elements of the periodic table. The amount of the metal element added may be the same as that described above in connection with the first embodiment of the black ink composition.

As with the first embodiment of the black ink composition, the second embodiment of the black ink composition may further contain an additional dye(s) so far as the addition thereof is not detrimental to the effect of waterfastness and reproduction of black color. Further, if necessary, water-soluble compounds, such as lower alcohols and sodium alginate, water-soluble resins, fluorosurfactants, antimolds, rust preventives and the like may be added to the ink composition.

When the second embodiment of the black ink composition is used in ink-jet recording, it preferably has the same viscosity and surface tension as described above in connection with the first embodiment of the black ink composition.

This embodiment of the black ink composition may be prepared by the same method as described above in connection with the first embodiment of the black ink composition.

Third Embodiment of Black Ink Composition

The third embodiment of the black ink composition comprises two kinds of dyes, a group A of dyes and a group B of dyes.

A combination of these two groups of dyes results in faithful reproduction of black color and, at the same time, realizes waterfast prints. Further, it enables black color to be faithfully reproduced on copying paper, called "plain paper," used in offices, schools, and households, such as copying paper, memo pad, bond paper, letter paper, postcards, and voucher paper, and, at the same time, can realize waterfast prints.

The ratio of the group A of dyes to the group B of dyes in the ink composition may be suitably determined in such a ratio range as will offer the above advantages. For example. However, it is preferably in the range of from 1:0.1 to 1:0.5 in terms of weight ratio.

The amount of the dyes added to the ink composition also may be suitably determined in such an amount range as will offer the above advantages. For example, it is preferably about 1 to 25% by weight, more preferably about 3 to 15% by weight.

In the ink composition according to this embodiment of the invention, the group A of dyes comprise a dye represented by the above formula (I) and a dye represented by the above formula (VII).

Dyes, represented by the formula (I), used in the ink composition according to this embodiment of the invention may be as defined above in connection with the first embodiment of the black ink composition. In this embodiment, in the dyes represented by the formula (I), although the position of the substituent $R^1$ is not particularly limited, preferred are dyes where $R^1$ is in the m-position to the azo group and represents $PO(OM)_2$ or COOM. Specific examples of preferred dyes may be the same as those described above in connection with the first embodiment of the black ink composition. Therefore, they include the above dyes (I-1) to (I-24).

According to a preferred embodiment of the invention, this embodiment of the black ink composition comprises the dye represented by the formula (I) and the dye represented by the formula (VII) in a weight ratio of 4:1 to 1:10 with the weight ratio being more preferably 3:1 to 1:5. When the weight ratio is in the above range, the dissolution of the group A of dyes in an aqueous medium can be improved and, at the same time, the dissolution stability can be improved.

The amount of the group A of dyes added to the ink composition may be suitably determined. For example, it is preferably about 1 to 20% by weight, more preferably about 2.5 to 10% by weight.

In this embodiment of the black ink composition, the group B of dyes are as defined above in connection with the second group of dyes in the first embodiment of the black ink composition. Specifically, the group B of dyes comprises a dye represented by the formula (II) and/or a dye represented by the formula (III). Specific examples of preferred dyes may be the same as those described above in connection with the first embodiment of the black ink composition. Therefore, they include the above dyes (II-1), (II-2), (III-1), and (III-2).

As with the ink composition according to the first embodiment of the black ink composition, in this embodiment of the black ink composition, preferably, M in the formula (I) represents a cation of a volatile compound with M in the formula (II) and/or (III) being a cation of an alkali metal. As described above, this combination is preferred from the viewpoints of waterfastness of the printed image and prevention of clogging of nozzles. The volatile compounds may be the same as those described above in connection with the first embodiment of the black ink composition.

The ink composition according to this embodiment of the black ink composition basically comprises the above groups of dyes, water, and an organic solvent.

For the same reason as described above in connection with the first embodiment of the black ink composition, in this embodiment of the black ink composition, a nitrogen-containing cyclic compound and a polyhydric alcohol as the solvent are used in combination with the above group of dyes. Specific examples and the amount of the nitrogen-containing cyclic compounds and polyhydric alcohols added may be the same as those described above in connection with the ink composition according to the first embodiment of the black ink composition.

In the ink composition according to the third embodiment of the black ink composition, the addition of a nonionic acetylene glycol surfactant is preferred for the same reason as described above in connection with the ink composition according to the first embodiment of the black ink composition. Specific examples and the amount of the nonionic acetylene glycol surfactant added may be the same as those described above in connection with the ink composition according to the first embodiment of the black ink composition.

Further, for the same reason as described above in connection with the first embodiment of the black ink composition, this embodiment of the black ink composition preferably contains a glycol ether. Specific examples and the amount of the glycol ether added may be the same as those described above in connection with the ink composition according to the first embodiment of the black ink composition.

For the same reason as described above in connection with the first embodiment of the black ink composition, the pH value of the ink composition according to this embodiment of the black ink composition is adjusted by the addition of the tri(hydroxyalkyl)amine. The amount of the tri(hydroxyalkyl)amine added may be the same as that described above in connection with the first embodiment of the black ink composition.

Further, for the same reason as described above in connection with the first embodiment of the black ink composition, this embodiment of the black ink composition preferably contains the tri(hydroxyalkyl)amine in combination with at least one hydroxide of metal element selected from the group consisting of the group Ia elements of the periodic table. The amount of the metal hydroxide may be the same as that described above in connection with the first embodiment of the black ink composition.

As with the first embodiment of the black ink composition, the third embodiment of the black ink composition may further contain an additional dye(s) so far as the addition thereof is not detrimental to the effect of waterfastness and reproduction of black color. Further, if necessary, water-soluble compounds, such as lower alcohols and sodium alginate, water-soluble resins, fluorosurfactants, antimolds, rust preventives and the like may be added to the ink composition.

When the ink composition according to the present invention is used in ink-jet recording, it preferably has the same viscosity and surface tension as described above in connection with the ink composition according to the first embodiment of the black ink composition.

The ink composition according to this embodiment of the black ink composition may be prepared by the same method as described above in connection with the first embodiment of the black ink composition.

EXAMPLES

The present invention will be described in more detail with reference to the following examples, though it is not limited to these examples only.

Example A

Ink compositions listed in the following table 1 were prepared.

In the following table, the ink compositions of the examples are yellow ink compositions according to the present invention. The numerical values in the table are in % by weight, and the balance of the composition consisted of ion-exchanged water.

TABLE 1

| | Example A | | | | | |
|---|---|---|---|---|---|---|
| | 1 | 2 | 3 | 4 | 5 | 6 |
| Y-1 | 0.8 | 0.5 | 1.5 | | | |
| Y-2 | | 1.5 | | | 0.8 | 1.0 |
| Y-3 | | | | 1.2 | 1.5 | |
| Y-4 | 1.2 | | 1.5 | | | |
| Y-5 | | | | 1.0 | | |
| Y-6 | | | | 0.5 | | 1.5 |
| C.I. Acid Yellow 23 | | | | | | |
| TEGmBE | | 12 | | 8 | 15 | |
| DEGmBE | 10 | | 10 | | | 5 |
| Diethylene glycol | 25 | 10 | | 10 | 15 | |
| Glycerin | | | 10 | 10 | 5 | 15 |
| 2-Pyrrolidone | | 5 | 5 | | | 5 |
| Triethanolamine | 0.1 | 0.9 | 0.1 | 0.9 | 0.9 | 0.9 |
| Potassium hydroxide | | | | | 0.1 | 0.1 |
| Aqueous ammonia (3 wt %) | | 3 | | 3 | 5 | 3 |
| Surfynol 465 | | 0.8 | | 0.8 | | 1.8 |
| Surfynol TG | 0.8 | | 0.8 | | 1.0 | |
| Proxel XL-2 | 0.3 | 0.3 | 0.3 | 0.3 | 0.3 | 0.3 |

In the table, TEGmBE is triethylene glycol monobutyl ether, DEGmBE diethylene glycol monobutyl ether, and Proxel XL-2 an antimold prepared by ZENECA.

Print Evaluation Tests

The above ink compositions were used to perform the following print evaluation tests. In the following evaluation tests, an experimental ink jet head (nozzle diameter 30 μm, 64 nozzles) of on-demand type, wherein liquid droplets are produced by taking advantage of oscillation of a piezoelectric device, was used under conditions of drive frequency 7.2 kHz, piezoelectric device drive voltage 25 V, and resolution 360 dots/in. to perform printing in an ink weight of 0.04 μg/dot.

The following paper were used for the evaluation of printed images.

(1) Super Fine paper for ink jet recording (Epson Hanbai Corporation)
(2) Gloss paper for ink jet recording (Epson Hanbai Corporation)
(3) Xerox 4024 (Xerox Co.)
(4) Xerox P (Fuji Xerox Co., Ltd.)
(5) Canon PB paper (Canon Sales Co., Inc.)

Test A1: Hue

For each ink composition, solid printing (blotted image printing) was performed on the recording paper.

In order to determine the hue, for the formed blotted image (3×3 cm), the L*a*b* color system of the color difference indication method specified in CIE (Commission International de l'Eclairage) was measured with Mcbeth CE-7000 manufactured by Mcbeth, and the color difference between the measured value and the tone standard value of ISO 2845-1975 was determined by the following equation (i).

TABLE 2

| | Yellow | Magenta | Cyan | Red | Green | Blue | Black |
|---|---|---|---|---|---|---|---|
| L* | 90.7 | 48.4 | 53.9 | 47.4 | 47.6 | 19.2 | 28.6 |
| a* | −18.4 | 78.1 | −19.1 | 70.3 | −74.1 | 35.5 | 0.1 |
| b* | 91.1 | −7.1 | −54.2 | 47.5 | 23.2 | −53.0 | −2.5 |

$$\Delta E^{*}ab=[(\Delta L^{*})^2+(\Delta a^{*})^2+(\Delta b^{*})^2]^{1/2} \qquad (i)$$

For the recording paper (1) to (5), the average value of the color difference ΔE*ab was determined, and the hue of yellow was evaluated according to the following criteria.

⊚: All the color difference ΔE*ab values was not more than 10.

○: The color difference ΔE*ab value was more than 10 and not more than 20.

×: The color difference ΔE*ab value exceeded 20.

Test A2: Waterfastness (1)

Print samples, for a blotted image on recording paper (1) and (4), obtained in test Example A1 were immersed in tap water for 10 sec, pulled up, and air dried. Thereafter, the L*a*b* color system was measured in the same manner as in Test A1, and, for each of three measured value before the test and the measured value after the test, the color difference ΔE*ab was determined by the above equation (i). The results were evaluated according to the following criteria.

⊚: All the color difference ΔE*ab values was not more than 10.

○: The color difference ΔE*ab value was more than 10 and not more than 20.

×: The color difference ΔE*ab value exceeded 20.

Test A3: Waterfastness (2)

Patterns of outline characters provided against yellow colored blotted image background of 100% duty, 200% duty, and 300% duty were printed on the recording paper (1) and (2). The prints thus formed were allowed to stand in an environment of 40° C. and 90% RH for 2 hr. Thereafter, evaluation was made on feathering in the printed area according to the following criteria.

⊚: No feathering

○: Slight feathering

×: Conspicuous feathering

Test A4: Lightfastness

Print samples of blotted images, printed on the recording paper (1) and (4), obtained in the test A1 were placed in a transparent plastic case and allowed to stand under sunlight for 30 days. ΔE*ab values before standing and after standing were determined by the above equation (i) and evaluated according to the following criteria.

⊚: All the color difference ΔE*ab values was not more than 20.

○: The color difference ΔE*ab value was more than 20 and not more than 30.

×: The color difference ΔE*ab value exceeded 30.

Test A5: Resumption of normal printing after clogging

The ink composition was filled into the print head of the printer and printed to confirm that the ink could be ejected through each nozzle. Thereafter, the print head was allowed to stand without capping in an environment of 40° C. for one week. After standing, printing was resumed, and the number of times of cleaning operation necessary for the ink to be successfully ejected through all the nozzles was counted. The results were evaluated according to the following criteria.

◎: Once
○: 2 or 3 times
×: Not less than 4 times

The evaluation results of the tests A1 to A6 are summarized in the following table.

TABLE 3

| Example | Test A1 | Test A2 | Test A3 | Test A4 | Test A5 |
|---------|---------|---------|---------|---------|---------|
| A1 | ◎ | ◎ | ○ | ◎ | ◎ |
| A2 | ◎ | ◎ | ◎ | ○ | ○ |
| A3 | ◎ | ◎ | ○ | ◎ | ◎ |
| A4 | ◎ | ◎ | ◎ | ◎ | ◎ |
| A5 | ◎ | ◎ | ◎ | ○ | ○ |
| A6 | ◎ | ◎ | ◎ | ◎ | ◎ |

Example B

Ink compositions listed in the following Table 4 were prepared. Specifically, ingredients listed in the table were stirred to mix them together, and the mixture was filtered by a 0.8-μm membrane filter to prepare a contemplated ink.

In the table, the ink compositions of the examples are magenta ink compositions according to the present invention. The numerical values in the table are in % by weight, and the balance of the composition consisted of ion-exchanged water.

TABLE 4

| | Example B | | | | | | | | | | |
|---|---|---|---|---|---|---|---|---|---|---|---|
| Ink composition | 1 | 2 | 3 | 4 | 5 | 6 | 7 | 8 | 9 | 10 | 11 |
| M-1 | 3.0 | | | | | | | | 1.5 | | |
| M-2 | | 2.2 | | | | | | | | | |
| M-3 | | | 1.8 | | | | | | | | |
| M-11 | | | | 3.3 | | | | | | | |
| M-12 | | | | | 2.5 | | | | | 1.0 | |
| M-13 | | | | | | 1.3 | | | | | |
| C.I. Reactive Red 147 | | | | | | | 2.8 | | 1.2 | | 1.2 |
| C.I. Reactive Red 180 | | | | | | | | 2.5 | | 2.0 | 1.5 |
| TEGmBE | 12 | 12 | | | 12 | 12 | | | 8 | 8 | 8 |
| DEGmBE | | | 10 | 10 | | | 10 | 10 | | | |
| Diethylene glycol | 8 | 10 | 10 | 10 | 8 | 10 | 10 | 10 | 13 | 12 | 11 |
| Glycerin | 8 | 7 | 7 | 9 | 8 | 7 | 7 | 9 | 6 | 8 | 8 |
| Urea | 5 | 6 | 7 | 5 | 5 | 6 | 7 | 5 | 7 | 6 | 6 |
| Ammonia (3% aq.) | 3 | 3 | 2 | 3 | 3 | 2 | 2 | 2 | 3 | 3 | 2 |
| Triethanolamine | 0.8 | 0.5 | 0.5 | 0.8 | 0.5 | 0.5 | 0.5 | 0.5 | | | 0.5 |
| Potassium hydroxide | 0.1 | 0.1 | 0.1 | 0.1 | 0.1 | | | | 0.1 | 0.1 | |
| Surfynol 465 | 0.5 | 0.5 | 0.5 | 0.8 | 0.5 | 0.5 | 0.5 | 0.8 | 1.0 | 1.2 | 1.2 |
| Proxel XL-2 | 0.3 | 0.3 | 0.3 | 0.3 | 0.3 | 0.3 | 0.3 | 0.3 | 0.3 | 0.3 | 0.3 |

In the table, TEGMBE is triethylene glycol monobutyl ether, DEGmBE diethylene glycol monobutyl ether, and Proxel XL-2 an antimold prepared by ZENECA.

Print Evaluation Tests

The above ink compositions were used to perform the following print evaluation tests. In the following tests, an ink jet printer MJ-500C (manufactured by Seiko Epson Corporation) was used with the ink implantation regulated to 1.41 mg/in.$^2$.

Test B1: Hue

For each ink composition, solid printing (blotted image printing) of magenta was performed on Super Fine paper, for ink jet recording, having a coating (Epson Hanbai Corporation). The blotted image area was tested in the same manner as in Test A1. The results were evaluated according to the same criteria as those used in Test A1.

Test B2: Clogging of nozzles

Printing was performed to confirm that the ink could be ejected through each nozzle. Thereafter, the print head was removed with the ink cartridge mounted thereon and allowed to stand without capping in an environment of 40° C. for 7 days. After standing, the nozzles were observed for solidification of the ink and wetting around the nozzles. The results were evaluated according to the following criteria.

◎: Neither solidification nor wetting
○: Slight wetting
×: Solidified ink projected Test B3: Resumption of normal printing after clogging The head used in Test B2 was mounted on the printer, followed by printing operation. The number of times of cleaning operation necessary for the ink to be successfully ejected through all the nozzles was counted. The results were evaluated according to the following criteria.

◎: once
○: 2 or 3 times
×: Not less than 4 times

Test B4: Lightfastness

Printing was performed on Super Fine paper, for ink jet recording, having a coating (Epson Hanbai Corporation) and a plain paper Xerox-P (Fuji Xerox Co., Ltd.) in the same manner as in Test A1. The prints were irradiated with light from a xenon tester (Shimadzu Seisakusho Ltd.) for 60 hr. ΔE*ab values before the test and after the test were determined in the same manner as in Test A1. The results were evaluated according to the same criteria as used in Test A1.

Test B5: Feathering in print on specialty paper and specialty film

Printing was performed on Super Fine paper, for ink jet recording, having a coating (Epson Hanbai Corporation) and a gloss film for ink jet recording (Epson Hanbai Corporation), and the prints were tested in the same manner as in Test A3. The results were evaluated in the same manner as in Test A3.

The evaluation results of the above tests are summarized in Table 5.

TABLE 5

| | Test B1 | Test B2 | Test B3 | Test B4 Specialty paper | Test B4 Plain paper | Test B5 Duty=100% Specialty paper | Test B5 Duty=100% Specialty film | Test B5 Duty=200% Specialty paper | Test B5 Duty=200% Specialty film | Test B5 Duty=300% Specialty paper | Test B5 Duty=300% Specialty film |
|---|---|---|---|---|---|---|---|---|---|---|---|
| Example | | | | | | | | | | | |
| B1 | ⊚ | ⊚ | ⊚ | ⊚ | ⊚ | ⊚ | ⊚ | ⊚ | ⊚ | ⊚ | ⊚ |
| B2 | ⊚ | ⊚ | ⊚ | ⊚ | ⊚ | ⊚ | ⊚ | ⊚ | ⊚ | ⊚ | ⊚ |
| B3 | ⊚ | ⊚ | ⊚ | ⊚ | ⊚ | ⊚ | ⊚ | ⊚ | ⊚ | ⊚ | ⊚ |
| B4 | ⊚ | ⊚ | ⊚ | ⊚ | ⊚ | ⊚ | ⊚ | ⊚ | ⊚ | ⊚ | ⊚ |
| B5 | ⊚ | ⊚ | ⊚ | ⊚ | ⊚ | ⊚ | ⊚ | ⊚ | ⊚ | ⊚ | ⊚ |
| B6 | ⊚ | ⊚ | ⊚ | ⊚ | ⊚ | ⊚ | ⊚ | ⊚ | ⊚ | ⊚ | ⊚ |
| B7 | ⊚ | ⊚ | ⊚ | ⊚ | ⊚ | ⊚ | ⊚ | ⊚ | ⊚ | ⊚ | ⊚ |
| B8 | ⊚ | ⊚ | ⊚ | ⊚ | ⊚ | ⊚ | ⊚ | ⊚ | ⊚ | ⊚ | ⊚ |
| B9 | ⊚ | ⊚ | ⊚ | ⊚ | ⊚ | ⊚ | ⊚ | ⊚ | ⊚ | ⊚ | ⊚ |
| B10 | ⊚ | ⊚ | ⊚ | ⊚ | ⊚ | ⊚ | ⊚ | ⊚ | ⊚ | ⊚ | ⊚ |
| B11 | ⊚ | ⊚ | ○ | ⊚ | ⊚ | ⊚ | ⊚ | ⊚ | ⊚ | ⊚ | ⊚ |
| Comparative Example | | | | | | | | | | | |
| B1 | ○ | ○ | x | ○ | ○ | ○ | ○ | ○ | ○ | ○ | ○ |
| B2 | ○ | ○ | ○ | ○ | x | x | x | x | x | x | x |
| B3 | x | x | x | ○ | ○ | ○ | ○ | ○ | ○ | ○ | ○ |
| B4 | ○ | ○ | x | ○ | ○ | ○ | ○ | x | ○ | x | x |
| B5 | ○ | ○ | ○ | x | x | ○ | ○ | ○ | ○ | ○ | ○ |
| B6 | ○ | x | x | ○ | ○ | ○ | ○ | ○ | ○ | ○ | ○ |
| B7 | ○ | x | x | ○ | ○ | ○ | ○ | ○ | ○ | ○ | ○ |

Example C

Yellow, magenta, and cyan compositions listed in the following Table 6 were prepared.

In the table, the numerical values in the table are in % by weight, and the balance of the composition consisted of ion-exchanged water.

TABLE 6

| Ink composition | | Example C1 | Example C2 | Example C3 |
|---|---|---|---|---|
| Yellow dye | Y-1 | 1.2 | | 0.8 |
| | Y-2 | | 1.0 | |
| | Y-4 | 0.7 | | 1.2 |
| | Y-5 | | 1.0 | |
| | C.I. Acid Yellow 23 | | | |
| Magenta dye | M-1 | 2.3 | | |
| | M-10 | | | |
| | M-12 | | 2.3 | |
| | M-14 | | | |
| | C.I. Reactive Red 147 | | | |
| | C.I. Reactive Red 180 | | | 2.5 |
| | C.I. Acid Red 249 | | | |
| Cyan dye | C-1 | | 6.0 | |
| | C-2 | | | 4.5 |
| | C-3 | | | |
| | C.I. Direct Blue 199 | | | 3.5 |
| | C.I. Acid Blue 9 | | | |
| Diethylene glycol | | 25 25 25 | | |
| Glycerin | | | 10 10 10 | 12 10 8 |
| 2-Pyrrolidone | | | 5 5 5 | |
| Thiodiglycol | | | | 10 10 10 |
| Diethylene glycol monobutyl ether | | 10 10 10 | | 10 10 10 |
| Triethylene glycol monobutyl ether | | | 12 12 12 | |
| Surfynol TG | | 0.8 0.8 0.8 | | |
| Surfynol 465 | | | 1 1 1 | 0.5 0.5 0.5 |
| Ethanol | | | | |
| 2-Propanol | | | | |
| Antimold | | 0.3 0.3 0.3 | 0.3 0.3 0.3 | 0.3 0.3 0.3 |

| Ink composition | | Example C4 | Example C5 | Example C6 |
|---|---|---|---|---|
| Yellow dye | Y-1 | | | 1.0 |
| | Y-2 | 1.0 | | |
| | Y-4 | 1.0 | 1.2 | |
| | Y-5 | | 0.8 | 1.2 |

TABLE 6-continued

| | | 1 | 2 | 3 | 4 | 5 | 6 | 7 | 8 | 9 |
|---|---|---|---|---|---|---|---|---|---|---|
| | C.I. Acid Yellow 23 | | | | | | | | | |
| Magenta dye | M-1 | | | | | | | | | |
| | M-10 | | 2.5 | | | | | | | |
| | M-12 | | | | | | | | | |
| | M-14 | | | | | 2.0 | | | | |
| | C.I. Reactive Red 147 | | | | | | | 3.0 | | |
| | C.I. Reactive Red 180 | | | | | | | | | |
| | C.I. Acid Red 254 | | | | | | | | | |
| Cyan dye | C-1 | | | 1.5 | | | | | | |
| | C-2 | | | | | | 1.0 | | | |
| | C-3 | | | | | | | | | |
| | C.I. Direct Blue 199 | | | 3.0 | | 3.0 | | | | 3.5 |
| | C.I. Acid Blue 9 | | | | | | | | | |
| Diethylene glycol | | 40 | 37 | 30 | | | | | | |
| Glycerin | | | | | 6 | 5 | 3.5 | 12 | 10 | 8 |
| 2-Pyrrolidone | | | | | 5 | 5 | 5 | | | |
| Thiodiglycol | | | | | | | | 10 | 10 | 10 |
| Diethylene glycol monobutyl ether | | 15 | 15 | 15 | | | | | | |
| Triethylene glycol monobutyl ether | | | | | 8 | 8 | 8 | | | |
| Surfynol TG | | | | | | | | | | |
| Surfynol 465 | | | | | 1 | 1 | 1 | 0.1 | 0.1 | 0.1 |
| Ethanol | | | | | 4 | 4 | 4 | | | |
| 2-Propanol | | | | | | | | 6 | 6 | 6 |
| Antimold | | 0.3 | 0.3 | 0.3 | 0.3 | 0.3 | 0.3 | 0.3 | 0.3 | 0.3 |

| Ink composition | | Example C7 | | | Example C8 | | | Example C9 | | |
|---|---|---|---|---|---|---|---|---|---|---|
| Yellow dye | Y-1 | 0.8 | | | 1.5 | | | | | |
| | Y-2 | | | | 0.5 | | | 0.5 | | |
| | Y-4 | 1.2 | | | | | | | | |
| | Y-5 | | | | | | | 2.0 | | |
| | C.I. Acid Yellow 23 | | | | | | | | | |
| Magenta dye | M-1 | | | | | | | 1.5 | | |
| | M-10 | | | | 2.8 | | | | | |
| | M-12 | | | | | | | 0.8 | | |
| | M-14 | 2.0 | | | | | | | | |
| | C.I. Reactive Red 147 | 0.5 | | | | | | | | |
| | C.I. Reactive Red 180 | | | | 1.0 | | | | | |
| | C.I. Acid Red 289 | | | | | | | | | |
| Cyan dye | C-1 | 0.6 | | | | | | | | |
| | C-2 | | | | | | 2 | | | |
| | C-3 | | | | | | | | | |
| | C.I. Direct Blue 199 | | | | 1.5 | | | | | 2.5 |
| | C.I. Acid Blue 9 | | | | | | | | | |
| Diethylene glycol | | 20 | 20 | 28 | | | | | | |
| Glycerin | | | | | 15 | 15 | 13 | 12 | 10 | 8 |
| 2-Pyrrolidone | | | | | 5 | 5 | 5 | | | |
| Thiodiglycol | | | | | | | | 10 | 10 | 10 |
| Diethylene glycol monobutyl ether | | 15 | 15 | 15 | | | | | | |
| Triethylene glycol monobutyl ether | | | | | | | | | | |
| Surfynol TG | | | | | | | | | | |
| Surfynol 465 | | | | | 1.8 | 1.8 | 1.8 | 0.1 | 0.1 | 0.1 |
| Ethanol | | | | | 4 | 4 | 4 | | | |
| 2-Propanol | | | | | | | | 6 | 6 | 6 |
| Antimold | | 0.3 | 0.3 | 0.3 | 0.3 | 0.3 | 0.3 | 0.3 | 0.3 | 0.3 |

| Ink composition | | Example C10 | | | Example C11 | | | Example C12 | | |
|---|---|---|---|---|---|---|---|---|---|---|
| Yellow dye | Y-1 | 0.8 | | | | | | 1.3 | | |
| | Y-3 | | | | 0.5 | | | 0.5 | | |
| | Y-4 | | | | 1.4 | | | | | |
| | Y-6 | 1.0 | | | | | | | | |
| | C.I. Acid Yellow 23 | | | | | | | | | |
| Magenta dye | M-1 | | 2.0 | | | | | | | |
| | M-10 | | | | | | | 1.5 | | |
| | M-12 | | | | 1.8 | | | 0.8 | | |
| | M-14 | | | | | | | | | |
| | C.I. Reactive Red 147 | 0.5 | | | | | | | | |
| | C.I. Reactive Red 180 | | | | 1.0 | | | | | |
| | C.I. Acid Red 289 | | | | | | | | | |
| Cyan dye | C-1 | | 6.0 | | | | | | | |
| | C-2 | | | | | | 2 | | | |
| | C-3 | | | | | | | | | |
| | C.I. Direct Blue 199 | | | | 1.5 | | | | | 2.5 |
| | C.I. Acid Blue 9 | | | | | | | | | |
| Diethylene glycol | | 20 | 20 | 28 | | | | 10 | 10 | 10 |
| Glycerin | | | | | 15 | 15 | 13 | 12 | 10 | 8 |
| 2-Pyrrolidone | | | | | 5 | 5 | 5 | | | |
| Thiodiglycol | | | | | | | | | | |

TABLE 6-continued

| | | | | | | | | | |
|---|---|---|---|---|---|---|---|---|---|
| Diethylene glycol monobutyl ether | 10 | 10 | 10 | | | | | | |
| Triethylene glycol monobutyl ether | | | | 7 | 7 | 7 | | | |
| Surfynol TG | 1.5 | 1.5 | 1.5 | | | | | | |
| Surfynol 465 | | | | 1.8 | 1.8 | 1.8 | 0.1 | 0.1 | 0.1 |
| Ethanol | | | | | | | | | |
| 2-Propanol | | | | | | | 6 | 6 | 6 |
| Antimold | 0.3 | 0.3 | 0.3 | 0.3 | 0.3 | 0.3 | 0.3 | 0.3 | 0.3 |

Print Evaluation Tests

The above ink compositions were used to perform the following print evaluation tests. In the following evaluation tests, the same apparatus and recording paper as used in Test A were used.

Test C1: Tone reproduction

Solid printing (blotted image printing) of yellow, magenta, cyan, red, green, and blue was performed on recording paper (1) to (5). In this case, red was formed by overprinting the yellow ink and the magenta ink, green was formed by overprinting the yellow ink and the cyan ink, and blue was formed by overprinting the magenta ink and the cyan ink.

For each of the formed blotted images (3×3 cm), a test on tone reproduction was performed in the same manner as in Test A1. The results were evaluated according to the following criteria.

⊚: The color difference ΔE*ab value was not more than 20 for all of red, green, and blue.

○: The color difference ΔE*ab value was more than 20 and not more than 30 for at least one of red, green, and blue.

×: The color difference ΔE*ab value was more than 30 for at least one of red, green, and blue.

Test C2: Waterfastness

Print samples, for a blotted image on recording paper (1) and (4), obtained in test Example C1 were tested in the same manner as in Test A2. The results were evaluated according to the following criteria.

⊚: The color difference ΔE*ab value was not more than 20 for all of red, green, and blue.

○: The color difference ΔE*ab value was more than 20 and not more than 30 for at least one of red, green, and blue.

×: The color difference ΔE*ab value was more than 30 for at least one of red, green, and blue.

Test C3: Lightfastness

Print samples, for a blotted image on recording paper (1) and (4), obtained in test Example C1 were tested in the same manner as in Test A4. The results were evaluated according to the following criteria.

⊚: The color difference ΔE*ab value was not more than 20 for all of red, green, and blue.

○: The color difference ΔE*ab value was more than 20 and not more than 30 for at least one of red, green, and blue.

×: The color difference ΔE*ab value was more than 30 for at least one of red, green, and blue.

Test C4: Feathering in print on specialty paper and specialty film

Printing of outline characters provided against solid print (blotted image print) background of yellow, magenta, cyan, red, green, blue, and black was performed on the recording paper (1) and (2). In this case, red was formed by overprinting the yellow ink and the magenta ink, green was formed by overprinting the yellow ink and the cyan ink, and blue was formed by overprinting the magenta ink and the cyan ink. Further, black was formed by overprinting the magenta ink, cyan ink, and yellow ink. The prints thus formed were allowed to stand in an environment of 40° C. and 90% RH for 2 hr. Thereafter, evaluation was made on feathering in the printed area according to the following criteria. Thereafter, a change in the outline characters from the original state was visually inspected. The results were evaluated according to the following criteria.

⊚: No feathering observed for outline characters of all of red, green, blue, and black, with the edge of the print pattern being sharp.

○: Slight feathering observed for outline characters of at least one of red, green, blue, and black, with the edge of the print pattern being unsharp.

×: Remarkable feathering observed for outline characters of at least one of red, green, blue, and black, causing colored outline character portions.

Test C5: Reproduction of black

Solid printing (blotted image printing) was performed by overprinting the yellow ink, the cyan ink, and the magenta ink. The printing was carried out in the order of cyan, magenta, and yellow inks.

For evaluation of the black reproduction, the a*b* color system by the color difference indication method was measured on the formed blotted image (3×3 cm) in the same manner as in Test A1. The chroma difference was determined by the following equation (ii) based on the measured value and the tone standard value specified in ISO 2845-1975.

$$\Delta C^*ab = [(\Delta a^*)^2 + (\Delta b^*)^2]^{1/2} \quad (ii)$$

The average of the chroma difference ΔC*ab for the recording paper (1) to (5) was determined, and the results were evaluated according to the following criteria.

⊚: ΔC*ab was not more than 10, with no separation of colors on the paper.

○: ΔC*ab exceeded 10, with no separation of colors on the paper.

×: ΔC*ab exceeded 10, with separation of colors on the paper.

The evaluation results of the above tests are summarized in Table 7.

TABLE 7

| Example | Test C1 | Test C2 | Test C3 | Test C4 | Test C5 |
|---|---|---|---|---|---|
| C1 | ⊚ | ○ | ⊚ | ⊚ | ⊚ |
| C2 | ⊚ | ⊚ | ⊚ | ⊚ | ⊚ |
| C3 | ⊚ | ○ | ⊚ | ⊚ | ⊚ |
| C4 | ⊚ | ○ | ⊚ | ⊚ | ⊚ |
| C5 | ⊚ | ⊚ | ⊚ | ⊚ | ⊚ |
| C6 | ⊚ | ○ | ⊚ | ⊚ | ⊚ |

TABLE 7-continued

| Example | Test C1 | Test C2 | Test C3 | Test C4 | Test C5 |
|---------|---------|---------|---------|---------|---------|
| C7      | ⊚       | ⊚       | ⊚       | ⊚       | ⊚       |
| C8      | ⊚       | ○       | ⊚       | ⊚       | ⊚       |
| C9      | ⊚       | ⊚       | ⊚       | ⊚       | ⊚       |
| C10     | ⊚       | ○       | ⊚       | ⊚       | ⊚       |
| C11     | ⊚       | ⊚       | ⊚       | ⊚       | ⊚       |
| C12     | ⊚       | ⊚       | ⊚       | ⊚       | ⊚       |

Example D

Yellow, magenta, and cyan compositions listed in the following Table 8 were prepared.

In the table, the numerical values in the table are in % by weight, and the balance of the composition consisted of ion-exchanged water.

TABLE 8

| Ink composition | | Example D1 | | | Example D2 | | | Example D3 | | |
|---|---|---|---|---|---|---|---|---|---|---|
| Yellow dye | Y-1 | 1.2 | | | | | | 0.8 | | |
|  | Y-2 | | | | 1.0 | | | | | |
|  | Y-4 | 0.7 | | | | | | 1.2 | | |
|  | Y-5 | | | | 1.0 | | | | | |
|  | C.I. Acid Yellow 23 | | | | | | | | | |
| Magenta dye | M-1 | | 2.3 | | | | | | | |
|  | M-2 | | | | | | | | 2.8 | |
|  | M-3 | | | | | 2.3 | | | | |
|  | C.I. Acid Red 249 | | | | | | | | | |
| Cyan dye | C-1 | | | 6.0 | | | | | | |
|  | C-2 | | | | | | 4.5 | | | |
|  | C-3 | | | | | | | | | |
|  | C.I. Direct Blue 199 | | | | | | | | | 3.5 |
|  | C.I. Acid Blue 9 | | | | | | | | | |
| Diethylene glycol | | 25 | 25 | 25 | | | | 5 | 5 | 5 |
| Glycerin | | | | | 10 | 10 | 10 | 10 | 10 | 10 |
| 2-Pyrrolidone | | | | | 5 | 5 | 5 | | | |
| Thiodiglycol | | | | | | | | 8 | 8 | 8 |
| Diethylene glycol monobutyl ether | | 10 | 10 | 10 | | | | 10 | 10 | 10 |
| Triethylene glycol monobutyl ether | | | | | 12 | 12 | 12 | | | |
| Surfynol TG | | 0.8 | 0.8 | 0.8 | | | | | | |
| Surfynol 465 | | | | | 1 | 1 | 1 | 0.5 | 0.5 | 0.5 |
| Ethanol | | | | | | | | | | |
| 2-Propanol | | | | | | | | | | |
| Antimold | | 0.3 | 0.3 | 0.3 | 0.3 | 0.3 | 0.3 | 0.3 | 0.3 | 0.3 |

| Ink composition | | Example D4 | | | Example D5 | | | Example D6 | | |
|---|---|---|---|---|---|---|---|---|---|---|
| Yellow dye | Y-1 | | | | | | | 1.0 | | |
|  | Y-2 | 1.0 | | | | | | | | |
|  | Y-4 | 1.0 | | | 1.2 | | | | | |
|  | Y-5 | | | | 0.8 | | | 1.2 | | |
|  | C.I. Acid Yellow 23 | | | | | | | | | |
| Magenta dye | M-1 | | | | | 3.0 | | | | |
|  | M-2 | | 3.5 | | | | | | 2.8 | |
|  | M-3 | | | | | | | | | |
|  | C.I. Acid Red 254 | | | | | | | | | |
| Cyan dye | C-1 | | | 1.5 | | | | | | |
|  | C-2 | | | | | | 1.0 | | | |
|  | C-3 | | | | | | | | | |
|  | C.I. Direct Blue 199 | | | 3.0 | | | 3.0 | | | 3.5 |
|  | C.I. Acid Blue 9 | | | | | | | | | |
| Diethylene glycol | | 23 | 27 | 20 | | | | | | |
| Glycerin | | | | | 6 | 5 | 3.5 | 12 | 10 | 8 |
| 2-Pyrrolidone | | | | | 5 | 5 | 5 | | | |
| Thiodiglycol | | | | | | | | 10 | 10 | 10 |
| Diethylene glycol monobutyl ether | | 15 | 15 | 15 | | | | | | |
| Triethylene glycol monobutyl ether | | | | | 8 | 8 | 8 | | | |
| Surfynol TG | | 0.3 | 0.3 | 0.3 | | | | | | |
| Surfynol 465 | | | | | 1 | 1 | 1 | 0.7 | 0.7 | 0.7 |
| Ethanol | | | | | 4 | 4 | 4 | | | |
| 2-Propanol | | | | | | | | 6 | 6 | 6 |
| Antimold | | 0.3 | 0.3 | 0.3 | 0.3 | 0.3 | 0.3 | 0.3 | 0.3 | 0.3 |

| Ink composition | | Example D7 | | | Example D8 | | | Example D9 | | |
|---|---|---|---|---|---|---|---|---|---|---|
| Yellow dye | Y-1 | 0.8 | | | 1.5 | | | | | |
|  | Y-2 | | | | 0.5 | | | 0.5 | | |
|  | Y-4 | 1.2 | | | | | | | | |

TABLE 8-continued

| | | | | | | | | | | |
|---|---|---|---|---|---|---|---|---|---|---|
| | Y-5 | | | | | | | 2.0 | | |
| | C.I. Acid Yellow 23 | | | | | | | | | |
| Magenta dye | M-3 | | | | | | | | 1.5 | |
| | M-4 | | 2.5 | | | 2.8 | | | | |
| | M-6 | | | | | | | | 0.8 | |
| | C.I. Acid Red 289 | | | | | | | | | |
| Cyan dye | C-1 | | | 6.0 | | | | | | |
| | C-2 | | | | | | 2 | | | |
| | C-3 | | | | | | | | | |
| | C.I. Direct Blue 199 | | | | | 1.5 | | | | 2.5 |
| | C.I. Acid Blue 9 | | | | | | | | | |
| Diethylene glycol | | 20 | 20 | 28 | | | | | | |
| Glycerin | | | | | 15 | 15 | 13 | 12 | 10 | 8 |
| 2-Pyrrolidone | | | | | 5 | 5 | 5 | | | |
| Thiodiglycol | | | | | | | | 10 | 10 | 10 |
| Diethylene glycol monobutyl ether | | 15 | 15 | 15 | | | | | | |
| Triethylene glycol monobutyl ether | | | | | | | | | | |
| Surfynol TG | | | | | | | | | | |
| Surfynol 465 | | | | | | 1.8 | 1.8 | 1.8 | 0.1 | 0.1 | 0.1 |
| Ethanol | | | | | | 4 | 4 | 4 | | | |
| 2-Propanol | | | | | | | | | 6 | 6 | 6 |
| Antimold | | 0.3 | 0.3 | 0.3 | 0.3 | 0.3 | 0.3 | 0.3 | 0.3 | 0.3 |

| Ink composition | | Example D10 | Example D11 | Example D12 |
|---|---|---|---|---|
| Yellow dye | Y-1 | 0.8 | | 1.3 |
| | Y-3 | | 0.5 | 0.5 |
| | Y-4 | | 1.4 | |
| | Y-6 | 1.0 | | |
| | C.I. Acid Yellow 23 | | | |
| Magenta dye | M-3 | 2.3 | | |
| | M-4 | | | 1.5 |
| | M-6 | | 1.8 | 0.8 |
| | C.I. Acid Red 289 | | | |
| Cyan dye | C-1 | 6.0 | | |
| | C-2 | | 2 | |
| | C-3 | | | 1.0 |
| | C.I. Direct Blue 199 | | 1.0 | 2.5 |
| | C.I. Acid Blue 9 | | | |
| Diethylene glycol | | 20 | 20 | 28 | 10 | 10 | 10 |
| Glycerin | | | | | 15 | 15 | 13 | 12 | 10 | 8 |
| 2-Pyrrolidone | | | | | 5 | 5 | 5 | | | |
| Thiodiglycol | | | | | | | | | | |
| Diethylene glycol monobutyl ether | | 10 | 10 | 10 | | | | 3 | 3 | 3 |
| Triethylene glycol monobutyl ether | | | | | 7 | 7 | 7 | | | |
| Surfynol TG | | 1.5 | 1.5 | 1.5 | | | | | | |
| Surfynol 465 | | | | | 1.8 | 1.8 | 1.8 | 0.1 | 0.1 | 0.1 |
| Ethanol | | | | | | | | | | |
| 2-Propanol | | | | | | | | 6 | 6 | 6 |
| Antimold | | 0.3 | 0.3 | 0.3 | 0.3 | 0.3 | 0.3 | 0.3 | 0.3 | 0.3 |

Print Evaluation Tests

The above ink compositions were used to perform the following print evaluation tests. In the following evaluation tests, the same apparatus and recording paper as used in Test A were used.

Test D1: Tone reproduction

The test was carried out in the same manner as in Test C1, and the results were evaluated according to the same criteria as used in Test C1.

Test D2: Reproduction of black

The test was carried out in the same manner as in Test C5, and the results were evaluated according to the same criteria as used in Test C5.

Test D3: Waterfastness (1)

Print samples, for a blotted image on recording paper (1) and (4), obtained in Test D1 were tested in the same manner as in Test A2. The results were evaluated according to the same criteria as used in Test A2.

Test D4: Waterfastness (2): Bleed of printed image on specialty paper and specialty film The test was carried out in the same manner as in Test C4, and the results were evaluated according to the same criteria as used in Test C4.

Test D5: Lightfastness

Print samples, for a blotted image on recording paper (1) and (4), obtained in Tests D1 and D2 were tested in the same manner as in Test A4. The results were evaluated according to the same criteria as used in Test A4.

The evaluation results of the above tests are summarized in the following Table 9.

TABLE 9

| Example | Test D1 | Test D2 | Test D3 | Test D4 | Test D5 |
|---|---|---|---|---|---|
| D1 | ⊚ | ⊚ | ○ | ⊚ | ⊚ |
| D2 | ⊚ | ⊚ | ⊚ | ⊚ | ⊚ |
| D3 | ⊚ | ⊚ | ○ | ⊚ | ⊚ |
| D4 | ⊚ | ⊚ | ⊚ | ⊚ | ⊚ |
| D5 | ⊚ | ⊚ | ⊚ | ⊚ | ⊚ |
| D6 | ⊚ | ⊚ | ○ | ⊚ | ⊚ |
| D7 | ⊚ | ⊚ | ⊚ | ⊚ | ⊚ |
| C8 | ⊚ | ⊚ | ○ | ⊚ | ⊚ |
| D9 | ⊚ | ⊚ | ⊚ | ⊚ | ⊚ |
| D10 | ⊚ | ⊚ | ○ | ⊚ | ⊚ |

TABLE 9-continued

| Example | Test D1 | Test D2 | Test D3 | Test D4 | Test D5 |
|---------|---------|---------|---------|---------|---------|
| D11 | ⊚ | ⊚ | ⊚ | ⊚ | ⊚ |
| D12 | ⊚ | ⊚ | ⊚ | ⊚ | ⊚ |

Example E

Black ink compositions 1 to 4 were prepared according to the following formulations.

In the following ink compositions, "%" is by weight unless otherwise specified.

| Black ink No. 1 | |
|---|---|
| Dye (I-6) | 1.5% |
| Dye (I-14) | 1.5% |
| Dye (VII-2) | 3% |
| Dye (II-3) | 1.5% |
| Diethylene glycol | 5% |
| Polyethylene glycol #200 | 5% |
| 1,5-Pentanediol | 5% |
| 2-Pyrrolidone | 5% |
| Propylene glycol monobutyl ether | 10% |
| Olfine STG | 0.8% |
| Triethanolamine | 0.5% |
| Potassium hydroxide | 0.1% |
| Proxel XL-2 | 0.3% |
| Water | Balance |
| Black ink No. 2 | |
| Dye (I-19) | 3.6% |
| Dye (VII-2) | 2.4% |
| Dye (II-1) | 1.2% |
| Glycerin | 5% |
| 2-Pyrrolidone | 5% |
| Diethylene glycol monobutyl ether | 10% |
| Olfine STG | 1% |
| Triethanolamine | 0.8% |
| Potassium hydroxide | 0.1% |
| Proxel XL-2 | 0.3% |
| Water | Balance |
| Black ink No. 3 | |
| Acidic carbon black (particle diameter: 140 nm) | 8% |
| Glycerin | 20% |
| Triethylene glycol monobutyl ether | 10% |
| Olfine STG | 0.8% |
| Triethanolamine | 1% |
| Potassium hydroxide | 0.1% |
| Proxel XL-2 | 0.3% |
| Water | Balance |
| Black ink No. 4 | |
| Acidic carbon black (particle diameter: 100 nm) | 8% |
| Glycerin | 15% |
| 1,5-Pentanediol | 5% |
| Diethylene glycol monobutyl ether | 8% |
| Olfine E1010 | 1% |
| Triethanolamine | 1% |
| Potassium hydroxide | 0.1% |
| Proxel XL-2 | 0.3% |
| Water | Balance |

The following printing tests were performed using combinations of color ink compositions and black ink compositions listed in Table 10 (Examples E1 to E34).

TABLE 10

| Example | Used color ink set | Used black ink No. |
|---------|-------------------|-------------------|
| E1 | C1 | 1 |
| E2 | C2 | 1 |
| E3 | C3 | 1 |
| E4 | C4 | 2 |
| E5 | C6 | 2 |
| E6 | C7 | 2 |
| E7 | C8 | 1 |
| E8 | C9 | 1 |
| E9 | C11 | 1 |
| E10 | C12 | 1 |
| E11 | D1 | 1 |
| E12 | D3 | 2 |
| E13 | D5 | 1 |
| E14 | D10 | 2 |

Print Evaluation Tests

Test E1: Color bleed

Ink sets of Examples E1 to E34 were used with an ink jet printer MJ-700V2/C to perform full color printing. Yamayuri (manufactured by Honshu Paper Co., Ltd.), Xerox P (manufactured by Fuji Xerox Co., Ltd.), Conqueror (manufactured by Conqueror), and Xerox 4024 (manufactured by Xerox). The color-to-color bleeding in the area between the colors and the black in the prints, that is, color bleed, was evaluated according to the following criteria.

⊚: No bleed observed for all the recording paper.

◯: Bleed observed for at least one of the recording paper, with the bleed posing no practical problem.

The results are summarized in the following table.

TABLE 11

| | Test 1 | | | |
|---|---|---|---|---|
| Example | Yamayuri | Xerox P | Conqueror | Xerox 4024 |
| E1 | ◯ | ⊚ | ◯ | ◯ |
| E2 | ◯ | ⊚ | ◯ | ◯ |
| E3 | ◯ | ⊚ | ◯ | ◯ |
| E4 | ◯ | ⊚ | ◯ | ◯ |
| E5 | ◯ | ⊚ | ◯ | ◯ |
| E6 | ◯ | ⊚ | ◯ | ◯ |
| E7 | ◯ | ⊚ | ◯ | ◯ |
| E8 | ◯ | ⊚ | ◯ | ◯ |
| E9 | ◯ | ⊚ | ◯ | ◯ |
| E10 | ◯ | ⊚ | ◯ | ◯ |
| E11 | ◯ | ⊚ | ◯ | ◯ |
| E12 | ◯ | ⊚ | ◯ | ◯ |
| E13 | ◯ | ⊚ | ◯ | ◯ |
| E14 | ◯ | ⊚ | ◯ | ◯ |

Test E2: Print density

The OD value in the black printed area and the printed area for each color in the prints obtained in Test E1 was measured with a Mcbeth densitometer. As a result, the OD value in the black printed area was not less than 1.2, and all the OD values in the printed area for individual colors were not less than 1.0, and, for all the color printed areas, the difference in OD value between the black printed area and the printed area for each color was not more than 0.2.

Test E3: Image quality

The prints obtained in Test E1 were visually observed by 10 panelists. As a result, all the panelists evaluated all the prints as a vivid print.

We claim:

1. An ink set comprising yellow, magenta and cyan ink compositions, the yellow ink composition comprising a dye represented by the formula (XI) and a dye represented by the formula (XII):

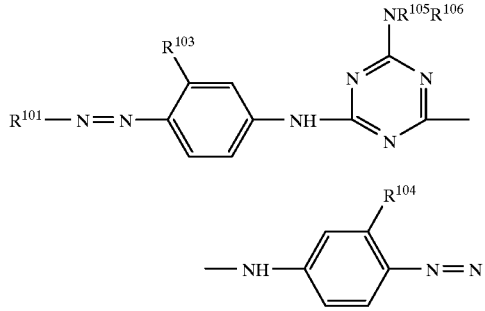
(XI)

wherein $R^{101}$ and $R^{102}$ each independently represent phenyl or naphthyl substituted by a substituent selected from the group consisting of a hydroxyl group, —$SO_3M$, and —COOM, $R^{103}$ and $R^{104}$ each independently represent a hydrogen atom, an alkyl, or methoxy, $R^{105}$ and $R^{106}$ each independently represent a hydrogen atom, a hydroxyl group, or $C_2H_4OH$, and M represents an alkali metal, ammonium, or an organic amine; and

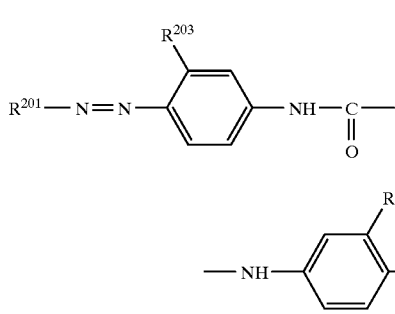
(XII)

wherein $R^{201}$ and $R^{202}$ each independently represent phenyl or naphthyl substituted by a substituent selected from the group consisting of a hydroxyl group, —$SO_3M$, and —COOM, $R^{201}$ and $R^{202}$ represent a hydrogen atom, an alkyl, or methoxy, and M represents an alkali metal, ammonium, or an organic amine, and the magenta ink composition comprising at member selected from the group consisting of a dye represented by the formula (XIII), a dye represented by the formula (XIV), C.I. Reactive Red 147 and C.I. Reactive Red 180:

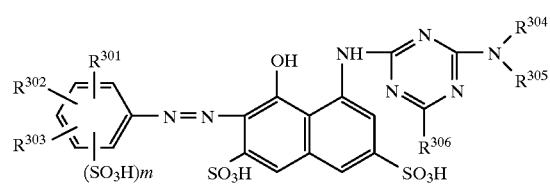
(XIII)

wherein $R^{301}$ $R^{302}$, and $R^{303}$ each independently represent a substituted or unsubstituted $C_{1-9}$ alkyl or $C_{1-9}$ alkoxy, a halogen atom, a hydrogen atom, hydroxyl, a substituted or unsubstituted carbamoyl, a substituted or unsubstituted sulfamoyl, a substituted or unsubstituted amino, nitro, a group —$SO_2R^{307}$ (wherein $R^{307}$ represents an ester forming group, a substituted or unsubstituted $C_{1-9}$ alkyl, or a substituted or unsubstituted $C_{6-15}$ aryl), a group —COOM (wherein M represents a hydrogen atom, an alkali metal, ammonia, or a cationic species derived from an amine), or a group —$COR^{308}$ (wherein $R^{308}$ represents an ester forming group), m is 0, 1, or 2, $R^{304}$ and $R^{305}$ each independently represent a hydrogen atom, a substituted or unsubstituted $C_{1-18}$ alkyl, a substituted or unsubstituted $C_{2-18}$ alkenyl, a substituted or unsubstituted aryl, a substituted or unsubstituted aralkyl, a substituted or unsubstituted alicyclic group, or a substituted or unsubstituted heterocyclic group, and $R^{306}$ represents a group —$NR^{309}R^{310}$ (wherein $R^{309}$ and $R^{310}$ each independently represent a hydrogen atom, a substituted or unsubstituted $C_{1-18}$ alkyl, or a substituted or unsubstituted aryl) or a group —$OR^{311}$ (wherein $R^{311}$ has the same meaning as $R^{304}$); and

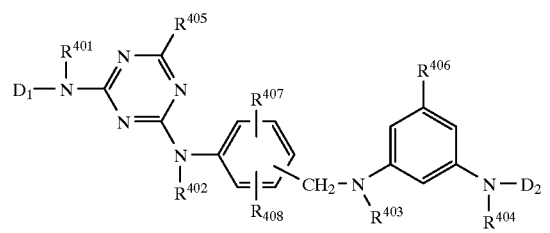
(XIV)

wherein $D_1$ and $D_2$ each independently represent an azo chromophore, $R^{401}$ $R^{402}$, $R^{403}$, and $R^{404}$ each independently represent a hydrogen atom or a substituted or unsubstituted alkyl, $R^{405}$ and $R^{406}$ each independently represent a hydroxyl group or an amino group, $R^{407}$ and $R^{408}$ each independently represent a hydrogen atom, a halogen atom, or an alkyl, alkoxy, nitro, carboxyl, or sulfone group, and M represents an alkali metal, ammonium, or an organic amine.

2. The ink set according to claim 1, wherein the yellow ink composition comprises 0.3 to 2.0% by weight of the dyes.

3. The ink set according to claim 1 or 2, wherein the magenta ink composition comprises 0.3 to 4.0% by weight of the member.

4. The ink set according to any one of claims 1 to 3, wherein the yellow and magenta ink compositions comprise at least one solid solvent selected from the group consisting of urea, trimethylolpropane, and trimethylolethane.

5. The ink set according to any one of claims 1 to 4, wherein the yellow and magenta ink compositions comprise 15 to 35% by weight of a water-soluble organic solvent.

6. The ink set according to any one of claims 1 to 5, wherein the yellow and magenta ink compositions further comprise 5 to 15% by weight of a polyhydric alcohol lower alkyl ether and 0.3 to 1.8% by weight of acetylene glycol represented by the following formula:

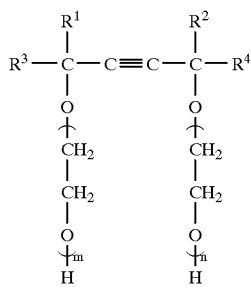

wherein $R^1$, $R^2$, $R^3$ and $R^4$ each independently represent a $C_{1-6}$ alkyl and n+m is 0 to 30.

7. The ink set according to any one of claims 1 to 6, wherein the yellow and cyan ink compositions comprise at least two components selected from the following components:

(a) an amine having a boiling point of −40° C. to 90° C., (b) an amine having a boiling point of 90° C. or above, and (c) an inorganic base, and with the ink compositions being adjusted to pH 8.5–11 at 20° C.

8. The ink set according to any one of claims 1 to 7, wherein the cyan ink composition comprises a phthalocyanine dye or C.I. Direct Blue 199 as a colorant.

9. The ink set according to claim 8, wherein the cyan ink composition comprises a dye represented by the following formula (XV) as a colorant:

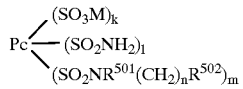

wherein Pc represents a phthalocyanine group coordinated with Cu, Fe, Co, or Ni as a central atom, $R^{501}$ represents a hydrogen atom or a substituted or unsubstituted alkyl, $R^{502}$ represents a hydroxyl group, COOH, or $NR^{503}R^{504}$ wherein $R^{503}$ represents a hydrogen atoms or a substituted alkyl and $R^{504}$ represents a substituted alkyl or a substituted phenyl, M represents an alkali metal, ammonium, or an organic amine, k and l are each independently 0 to 1, m is 1 to 4, provided that $2 \leq k+l+m \leq 4$, n is an integer of 1 to 15, provided that, when $R^{502}$ represents a hydroxyl group, n is an integer of 5 to 15.

10. An ink set according to claim 9, wherein the cyan ink composition comprises 0.5 to 6.0% by weight of the dye represented by the formula (XV) or C.I. Direct Blue 199.

11. The ink set according to any one of claims 1 to 10, which further comprises a black ink composition comprising at least a first group of dyes and a second group of dyes, the first group of dyes comprising a dye represented by the following formula (I) wherein $R^1$ is $PO(OM)_2$ in the m-position to the azo group and a dye represented by the following formula (I) wherein $R^1$ is COOM in the m-position to the azo group,

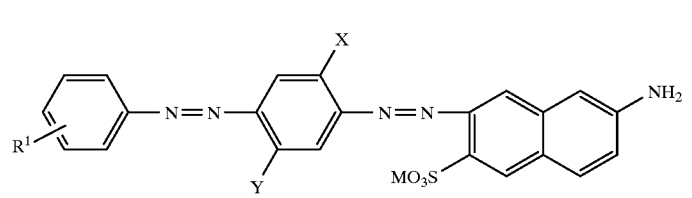

wherein $R^1$ represents —$PO(OM)_2$ or —COOM, X and Y each independently represent a $C_{1-4}$ alkoxy and M represents a cation of a group selected from the group consisting of a hydrogen atom, an alkali metal, ammonia, and an organic amine; and the second group of dyes comprising a dye represented by the following formula (II) and/or a dye represented by the following formula (III):

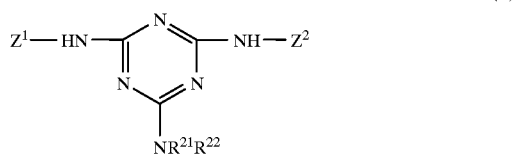

(III)

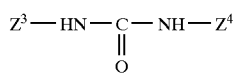

wherein $R^{21}$ and $R^{22}$ each independently represent a hydrogen atom or —$C_2H_4OH$, $Z^1$, $Z^2$, $Z^3$ and $Z^4$ each independently represent a group represented by the following formula (IV) or (V):

(IV)

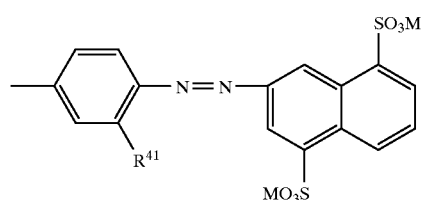

(V)

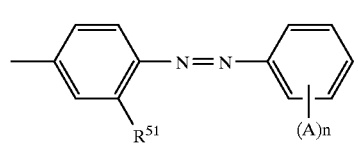

wherein $R^{41}$ and $R^{51}$ each independently represent a hydrogen atom, a $C_{1-4}$ alkyl or a $C_{1-4}$ alkoxy, A represents —$SO_3M$ or —COOM, M is as defined above and n is 1 or 2.

12. The ink set according to any one of claims 1 to 10, which further comprises a black ink composition comprising a dye represented by the formula (I) defined in claim 11, wherein $R^1$ is in the m-position to the azo group and represents $PO(OM)_2$ or COOM, and a dye represented by the following formula(VI):

(VI)

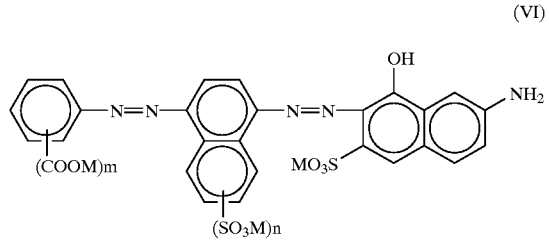

wherein M is as defined above;

m is 1 or 2; and n is 0 or 1.

13. The ink set according to any one of claims 1 to 10, which further comprises a black ink composition comprising a group A of dyes and a group B of dyes, the group A of dyes comprising a dye represented by the following formula (I)

(I)

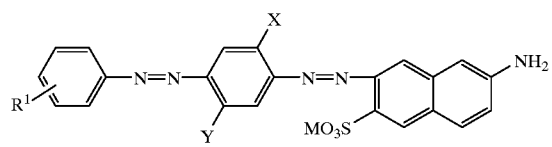

wherein $R^1$ represents —$PO(OM)_2$ or —COOM, X and Y each independently represent a $C_{1-4}$ alkoxy and M represents a cation of a group selected from the group consisting of a hydrogen atom, an alkali metal, ammonia, and an organic amine; and a dye represented by the following formula (VI)

(VI)

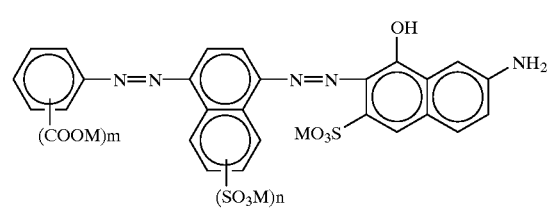

wherein M is an alkali metal, ammonium or an organic amine;

m is 1 or 2; and n is 0 or 1;

the group B of dyes comprising a dye represented by the following formula (II) and/or a dye represented by the following formula (III):

(II)

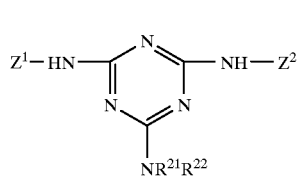

(III)

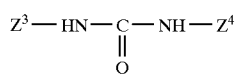

wherein $R^{21}$ and $R^{22}$ each independently represent a hydrogen atom or —$C_2H_4OH$, $Z^1$, $Z^2$, $Z^3$ and $Z^4$ each independently represent a group represented by the following formula (IV) or (V):

(IV)

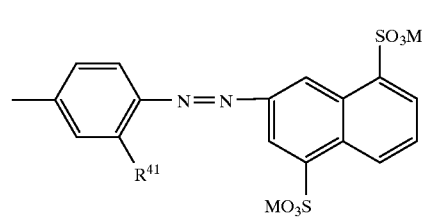

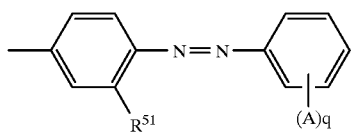

(V)

wherein $R^{41}$ and $R^{51}$ each independently represent a hydrogen atom, a $C_{1-4}$ alkyl or a $C_{1-4}$ alkoxy, A represents —$SO_3M$ or —COOM, M is as defined above and q is 1 or 2.

14. A recording method comprising the step of depositing an ink composition onto a recording medium to perform printing, wherein the ink composition comprises the ink set according to any one of claims 1 to 10.

15. An ink jet recording method comprising the steps of: ejecting droplets of an ink composition; and depositing the ejected droplets on a recording medium to perform printing, wherein the ink composition comprises the ink set according to any one of claims 1 to 10.

16. A color recording method comprising the step of depositing an ink composition onto a recording medium to perform printing, wherein the ink composition comprises the ink set according to any one of claims 1 to 10.

17. A color ink jet recording method comprising the steps of: ejecting droplets of an ink composition; and depositing the ejected droplets on a recording medium to perform printing, wherein the ink composition comprises the ink set according to any one of claims 1 to 10.

18. A record medium prented by the method according to any one of claims 14 to 17.

19. A yellow ink composition comprising at least a dye, a water-soluble organic solvent, and water,
    the dye comprising a dye represented by the formula (XI) and a dye represented by the formula (XII) defined in claim 1.

20. The ink composition according to claim 19, wherein the amount of each dye added is 0.3 to 2.0% by weight.

21. A magenta ink composition comprising at least a dye, a water-soluble organic solvent, and water, wherein the dye is represented by the formula (XIV) defined in claim 1.

22. The ink composition according to claim 21, wherein the content of the dye is 0.3 to 4.0% by weight.

23. An ink composition according to claim 21 or 22, which comprises at least one solid solvent selected from the group consisting of urea, trimethylolpropane, and trimethylolethane.

24. An ink composition according to any one of claims 19–22, wherein the content of the water-soluble organic solvent is 15 to 35% by weight.

25. The ink composition according to any one of claims 19 to 24, which further comprises 5 to 15% by weight of a polyhydric alcohol lower alkyl ether and 0.3 to 1.8% by weight of acetylene glycol represented by the following formula

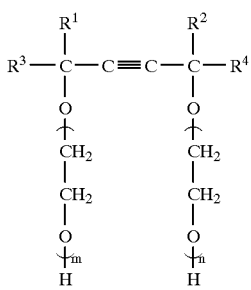

wherein $R^1$ $R^2$, $R^3$ and $R^4$ each independently represent a $C_{1-6}$ alkyl and n+m is 0 to 30.

26. The ink composition according to any one of claims 19 to 24, which comprises at least two components selected from the following components:

(a) an amine having a boiling point of −40° C. to 90° C., (b) an amine having a boiling point of 90° C. or above, and (c) an inorganic base, and with the ink being adjusted to pH 8.5–11 at 20° C.

* * * * *